United States Patent
Cook et al.

(10) Patent No.: US 6,250,619 B1
(45) Date of Patent: Jun. 26, 2001

(54) CLAMP SUITABLE FOR USE AT HIGH TEMPERATURES IN A FLEXIBLE TOOLING APPARATUS

(75) Inventors: Larry R. Cook, Woodinville; Robert A. Starr, Auburn; Robert B. Erley, Kirkland; Jeffrey A. Sterk, Snoqualmie, all of WA (US)

(73) Assignee: CNA Manufacturing Systems, Inc., Woodinville, WA (US)

( * ) Notice: Subject to any disclaimer, the term of this patent is extended or adjusted under 35 U.S.C. 154(b) by 0 days.

(21) Appl. No.: 09/243,103

(22) Filed: Feb. 2, 1999

Related U.S. Application Data

(60) Provisional application No. 60/073,587, filed on Feb. 3, 1998.

(51) Int. Cl.[7] ..................................... B23Q 3/10
(52) U.S. Cl. ......................... 269/20; 269/266; 269/329
(58) Field of Search ......................... 279/121, 122, 279/50, 57, 74; 294/86.4, 96, 64.1; 269/266, 20, 21, 309, 43

(56) References Cited

U.S. PATENT DOCUMENTS

| | | |
|---|---|---|
| 2,471,921 * | 5/1949 | Ashdown .............................. 297/50 |
| 3,542,354 | 11/1970 | Fitzpatrick . |
| 3,853,313 | 12/1974 | Appenzeller et al. . |
| 3,926,447 * | 12/1975 | Cox ........................................ 279/57 |
| 4,080,716 | 3/1978 | vom Dorp . |
| 4,088,312 | 5/1978 | Frosch et al. . |
| 4,317,577 | 3/1982 | Cameron . |
| 4,432,559 | 2/1984 | Rasmussen . |
| 4,638,984 * | 1/1987 | Puisais et al. ......................... 269/43 |
| 4,684,113 | 8/1987 | Douglas et al. . |
| 4,736,957 * | 4/1988 | Bischopink ........................... 279/57 |
| 5,163,793 | 11/1992 | Martinez . |
| 5,230,594 | 7/1993 | Pilkington . |
| 5,364,083 | 11/1994 | Ross et al. . |
| 5,372,357 | 12/1994 | Blaimschein . |
| 5,457,868 | 10/1995 | Blaimschein . |
| 5,546,784 | 8/1996 | Haas et al. . |
| 5,551,677 | 9/1996 | Puettmer et al. . |
| 5,562,276 | 10/1996 | Blick . |
| 5,722,646 | 3/1998 | Soderberg et al. . |

* cited by examiner

Primary Examiner—Robert C. Watson
(74) Attorney, Agent, or Firm—Dellett and Walters

(57) ABSTRACT

A clamp for clamping extendible supports in flexible tooling system includes three overlapping tapered collets surrounding the extendible support, with a set of ball bearings positioned between each of the collets. The middle collet is tapered in a direction opposite to that of the inner and outer collets, so that when the middle collet is pressed by springs into a gap between the inner and outer collet, the inner collet is forced against the extendible support, thereby clamping it. The ball bearings and the three collet assembly prevent the clamp from binding with thermal expansion so that the clamp releases when the force pressing the middle collet into the space between the inner and outer collet is removed. The springs maintain a sustained clamping force so the clamp does not release upon thermal expansion of it components.

13 Claims, 18 Drawing Sheets

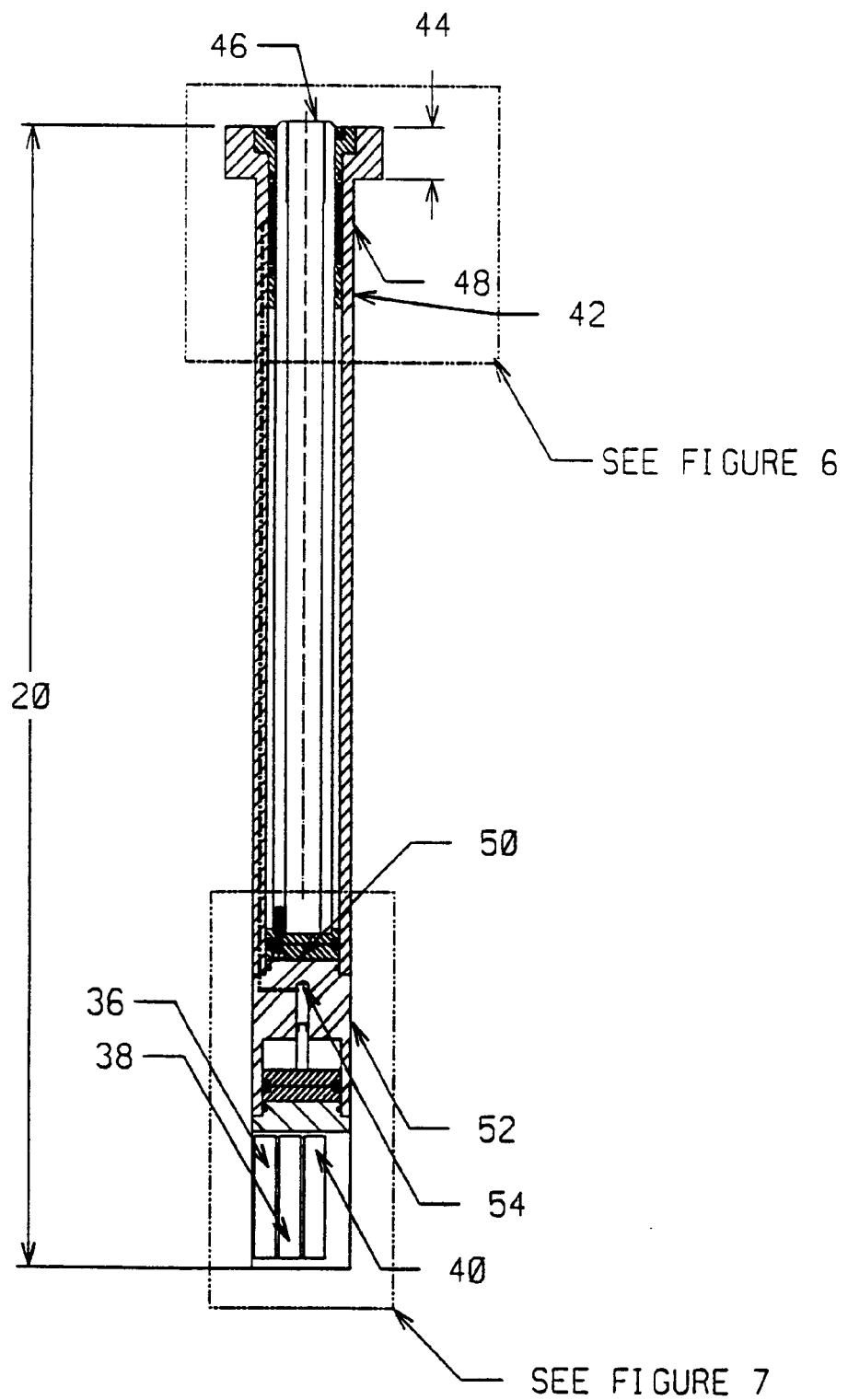

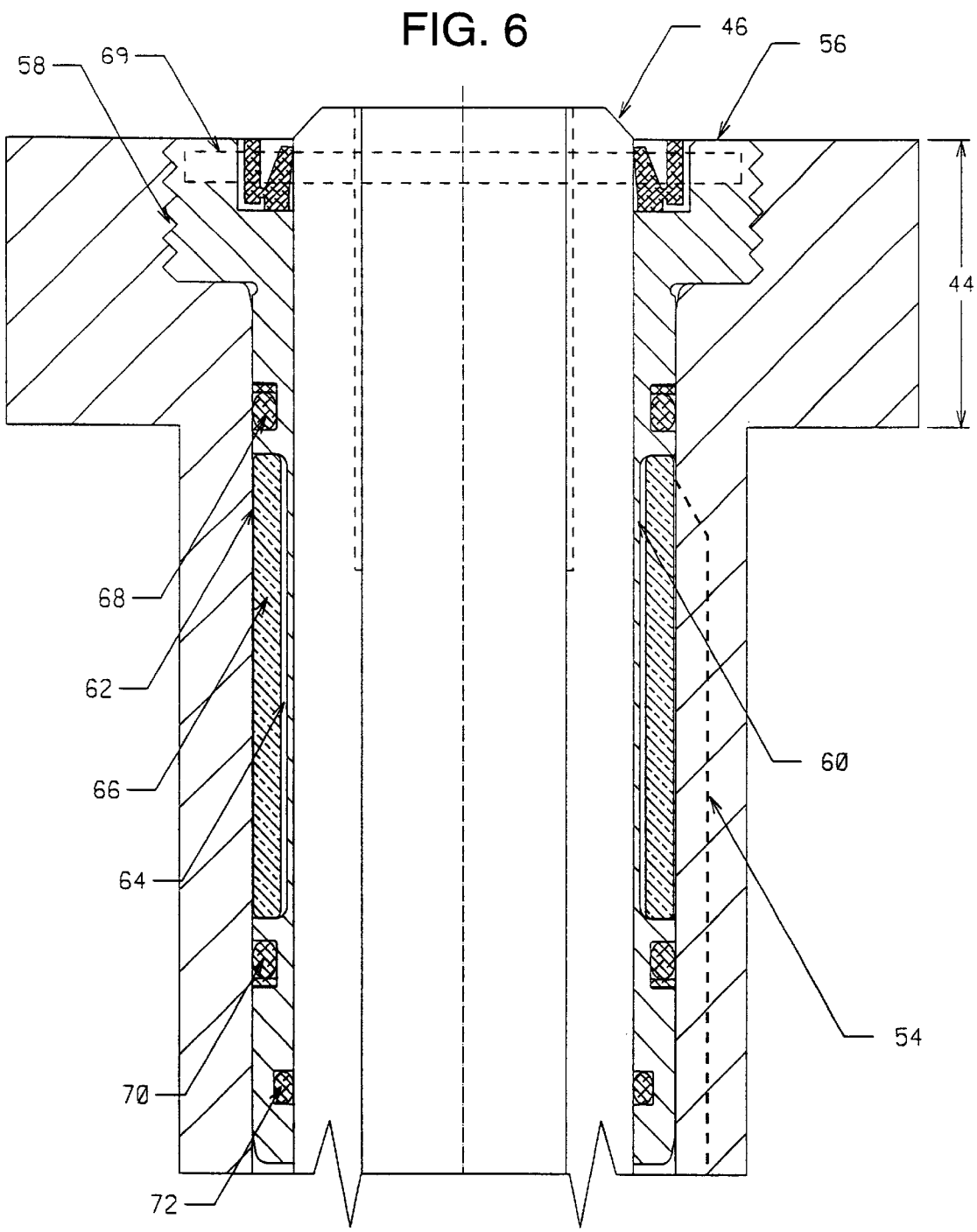

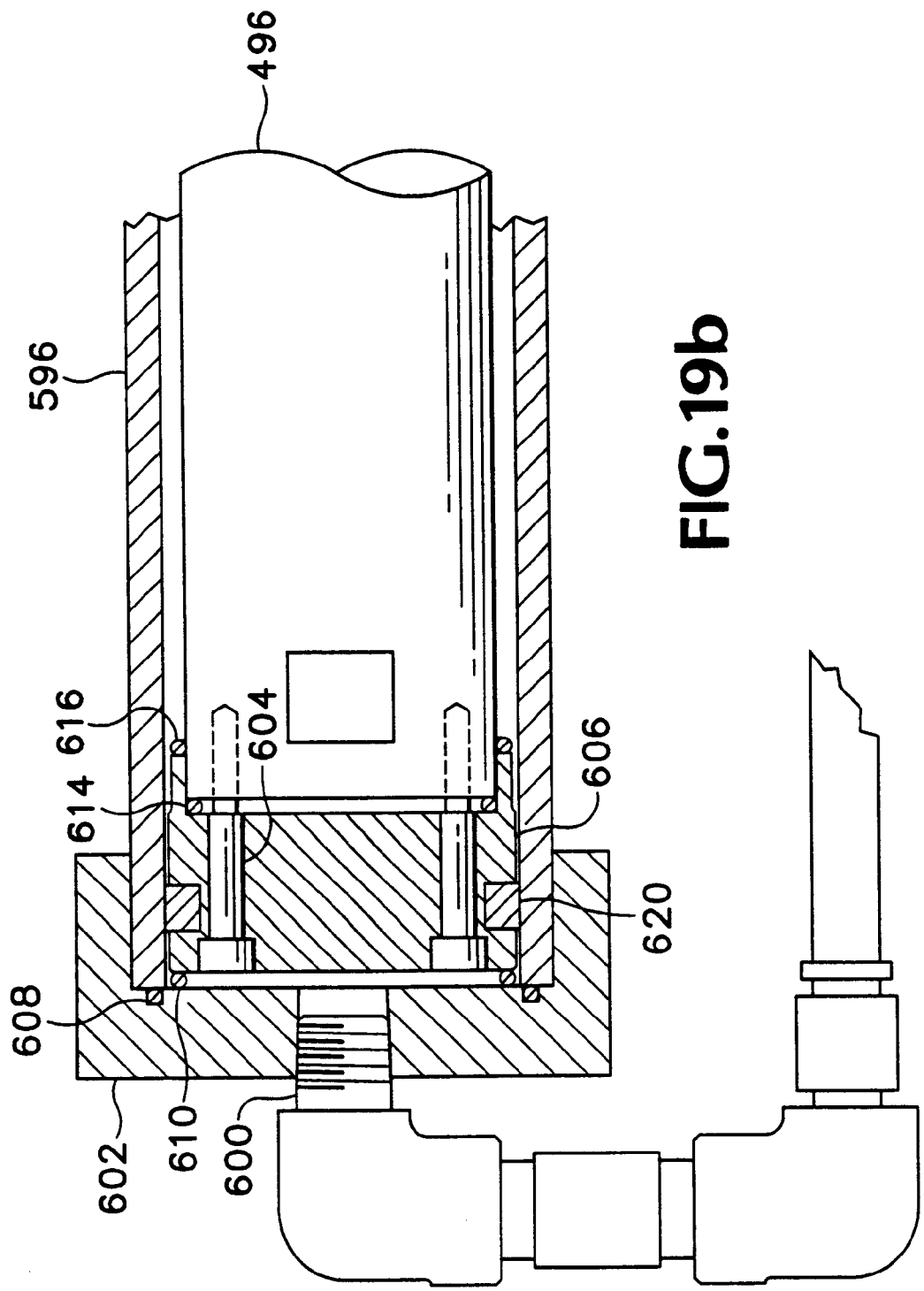

CLAMP SUITABLE FOR USE AT HIGH TEMPERATURES IN A FLEXIBLE TOOLING APPARATUS

This application claim benefit to Provisional application Ser. No. 60/073,587 filed Feb. 3, 1998.

BACKGROUND OF THE INVENTION

This invention relates to machine tools and more specifically to a flexible tooling apparatus for providing a support deck for use with machine tools or assembly tools for processing materials.

When machining material with machine tools, assembling material for fastening, or performing other processing, such as heat curing, it is necessary to provide a support system for the material being machined or operated upon. In the past, such supports have comprised a tooling support which substantially conforms to the three-dimensional shape of the part or item being processed. The cost to design, fabricate and store such tooling supports can become prohibitive. A separate tooling support is required for each uniquely shaped item being processed. Often the setup time and effort to prepare and position the tooling die becomes greater than the time involved in actual machining or processing of the part.

To resolve some of the drawbacks of the fixed tooling die situation, variable tooling supports have been developed, for example, as described in U.S. Pat. No. 5,372,357, wherein a plurality of spaced supports are provided in fixed relation to one another and the supports are adjusted heightwise to support the work piece at certain points. The work piece is then either clamped to the supports or the supports provide some sort of clamping through the use of vacuum at the suction cups, for example.

Heretofore, these systems have been quite expensive and complex with a large number of interactions required to provide the appropriate control and power to cause the raising and lowering, as well as the application of vacuum to each of multiple support members. Variable systems which allow movement of the support stanchions in a horizontal plane, as well as the vertical extension thereof, provide even further difficulties given that control wires, power wires and hydraulic or pneumatic or vacuum supply lines are required to also be movable. Maintenance costs related to such systems can be quite high. Over the useful life of such an apparatus, the potential for failure of electrical connections, for example, becomes greater with each successive movement. Further, the cost of such systems is out of the reach of many businesses and such a system may be overly complex for small business applications.

The design of flexible tooling systems is further complicated because of the high temperatures at which many modern manufacturing processes are performed. Such processes include heat treatments, coating applications, and formation of parts from composite materials, which formation can take place at around temperatures of around 400° F. (204° C.). At high temperatures, adequate work piece support can be critical because work pieces tend to deform more readily under their own weight.

Some known clamp mechanisms that fix the extensible supports at the desired extension can loosen at high temperatures, due to thermal expansion of the parts in the clamping assembly. Other clamps tend to bind at high temperatures due to the uneven expansion of the parts in the clamping assembly, thereby preventing releasing of the clamp. Moreover, at high temperatures, the hydraulic systems used to clamp the extendible supports tend to have more problems, such as leaks caused by thermal expansion of fittings and reduced useable lifetime of hydraulic fluids, not to mention the safety issues that arise with flammable fluids in an elevated temperature environment.

SUMMARY OF THE INVENTION

In accordance with an aspect of the present invention, a flexible tooling system is provided wherein a support table has a plurality of apertures therein. Said apertures are adapted for receiving a self-contained actuator in removable relation therewithin.

In one aspect, each position of the support table provides a vacuum and air supply line as well as a bus or network interface so that each position may be addressed separately. The removable actuator has corresponding connectors for receiving the vacuum and air supply as well as for interfacing with the bus, each position having a unique address so that an actuator may be placed at a particular location by insertion into the receptacle at the table aperture and subsequent securing thereto. The actuator may then be addressed on the bus to command the actuator to raise, lower, lock in position and supply vacuum.

In accordance with another aspect of this invention, the actuator includes an extensible member that is fixed in position by a clamp after its height above the table is adjusted to provide support for the work piece. As temperature changes of the flexible tooling system cause dimensional changes of its components, the inventive clamp maintains a secure hold on the actuator, yet does not bind when released, thereby allowing the extension of the extensible member to be changed when the clamp actuating force is removed.

In one aspect of the invention, the clamp uses a bearing element to separate the clamping members that engage each other to fix the position of the extensible member. The bearing element allows relative movement of the clamping members while the clamp is engaged, which prevents binding when the force biasing the parts into engagement is removed.

In another aspect of the invention, a sustained biasing force maintains the clamp engagement, even as components of the clamp change dimensions due to temperature or other changes.

In yet another aspect of the invention, an inside clamping member and an outside clamping member define a space into which a middle clamping member is inserted. As the middle member is pressed into the space, the middle member clearance decreases to zero causes the middle member to exert a force on the inside and outside clamping members, thereby causing the clamping members to releasably fix the extensible member.

In still another aspect of the invention, a clamp includes two clamp assemblies, with the second assembly arranged as a mirror image of the first assembly, thereby providing increased clamping strength and allowing the use of a single clamp release mechanism.

In a preferred embodiment, the clamp uses three collets: an inner collet, an outer collet, and a tapered middle collet, with a set of ball bearings on either side of the middle collet. To engage the clamp, the middle collet is pressed into the gap between the inner and outer collet and biased by springs inward between the ball bearings, forcing the inner collet to frictionally engage the extensible member and the outer collect to frictionally engage the clamp housing, thereby fixing the extensible member in relation to the housing. The ball bearings allow relative movement between the collets while the clamp is engaged to prevent binding, allowing the middle collect to move to a disengaged position when the bias is removed. The springs provide a sustained biasing force to keep the clamp tight, even as the clamp components expand or contract.

It is accordingly an object of the present invention to provide an improved flexible tooling support system.

It is a further object of the present invention to provide an improved flexible tooling support system which allows easy removal and repositioning of support actuators.

It is still a further object of the present invention to provide an improved flexible tooling system wherein individual actuators are passively moved to an appropriate position and then locked into place.

It is yet another object of the present invention to provide an improved flexible tooling system wherein individual actuators are actively operable to position themselves to a precision position.

It is yet a further object of the present invention to provide an improved flexible tooling system with active positioning with a non-servo technology.

It is still another an object of the present invention to provide a flexible tooling system for use in a high temperature environment.

It is a still further object of the present invention to provide a clamp for securely yet releasably fixing the extension of the extensible supports used with a flexible tooling system.

It is still another object of the present invention to provide an improved, releasable clamp that provides sustained clamping yet is freely releasable as the clamp assembly is subjected to temperature changes.

It is still another object of the invention to provide a non-hydraulic clamp that securely engages a clamped object.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 5 is a cross-sectional view of a typical passive actuator;

FIG. 6 is a more detailed cross-sectional view of a portion of the actuator of FIG. 5 illustrating the locking mechanism for securing an individual actuator in position once the desired position has been obtained;

FIGS. 19a and 19b are cross-sectional view of the actuator of FIG. 18, with some detail omitted for clarity.

DETAILED DESCRIPTION

Figure 1:
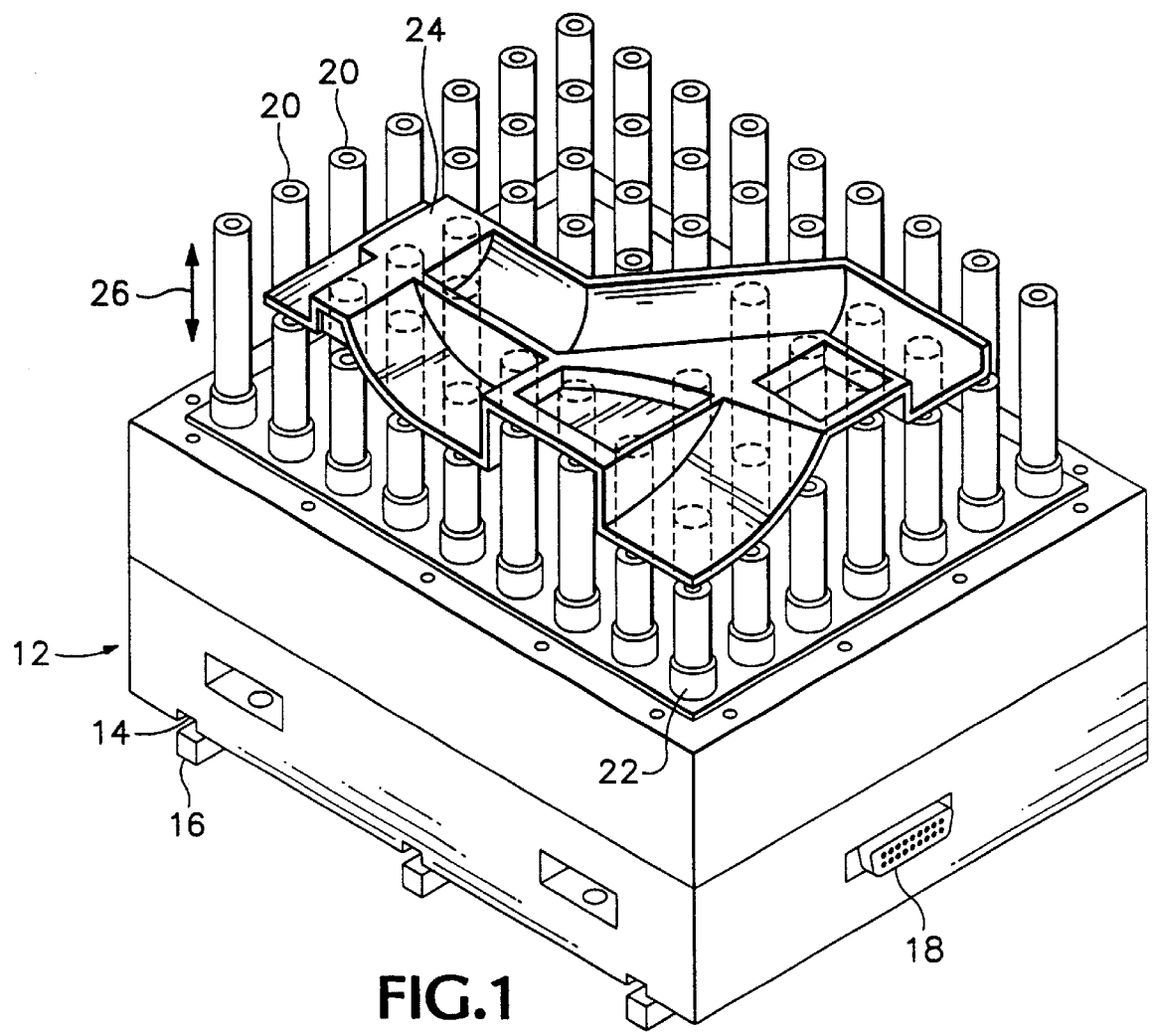
FIG. 1 is a perspective view showing a flexible tooling system with a representative part positioned thereon.

Referring now to FIG. 1, a perspective view of a section of a support system according to the present invention with a part supported thereon, the flexible tooling system comprises a table portion 12 which is modular in construction so as to enable plural table portions 12 to be placed adjacent one another to provide variable size support surfaces. The table portion 12 is substantially rectangular and includes three positioning slots 14 at the bottom thereof which extend substantially from one edge of the table portion to an opposing edge. The slots mate with corresponding guide members 16 which are located as appropriate at a work site to enable the table portion 12 to be precisely positioned by placement on top of guide members 16. Table portion 12 also includes an electrical interface 18 which supplies electrical power as well as addressing information to each of plural positions for actuator placement. The actuators 20 are arranged in spaced relation as mounted in actuator holes 22 in table portion 12. The actuator holes may be spaced in alternating offset rows or may also be provided in regular rows, as illustrated in FIG. 1, and provide mounting points wherein an actuator 20 may be inserted into a mounting hole 22 and secured to the table by any suitable means, for example, bolting. The part 24 being machined or otherwise worked sits atop actuators 20 which provide a variable height surface for supporting the part. Each actuator may be extended or retracted vertically along axis 26 to provide variable height surfaces. The cooperation between multiple actuators and their varied adjustment heights provides a support surface that conforms to the contour of the part. Note that it is not necessary that the part be supported by the actuators over a continuous surface, but that providing various support points is sufficient.

While the table 12 as illustrated in FIG. 1 carries actuators in each of actuator holes 22, the system is such that actuators need not be present in each of the holes 22. Accordingly, table 12 need not be fully populated with actuators, providing reduced cost and flexibility.

Figure 2:
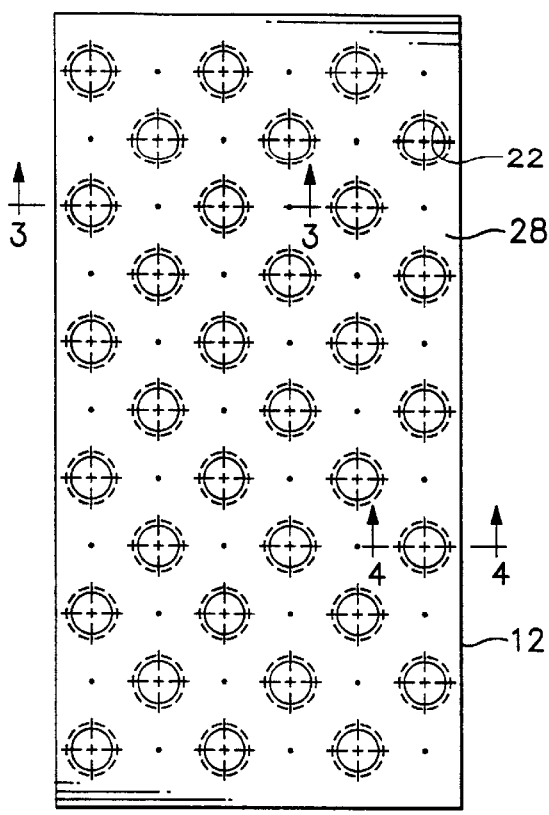
FIG. 2 is a top view of a support table section.

Referring to FIG. 2, which is a top view of support table 12 with no actuators placed therein, the alternating row patterns of the support holes 22 may be observed. More than one support table 12 may be placed adjacent each other in end-to-end or side-by-side relation to provide a variable sized tooling bed.

Figure 3:
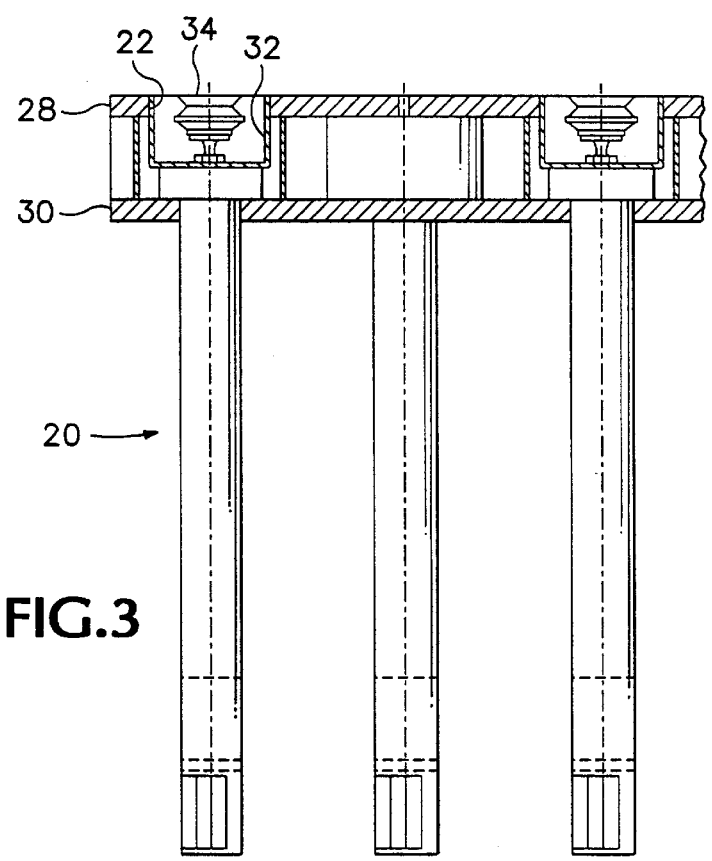
FIG. 3 is a sectional view of the table of FIG. 2 taken along line 3—3 of FIG. 2 illustrating placement of actuators in relation to the table when in retracted position.

Referring now to FIG. 3, which is a cross-sectional view taken along line 3—3 of FIG. 2, illustrating a support table with two actuators therein, it may be observed that the table comprises an upper table portion 28 which has apertures 22 defined therein as well as a lower table portion 30 which is in spaced relation below upper table portion 28. A liner 32 defines a space between upper table portion 28 and lower table portion 30 and substantially seals the inner volume between the two table portions against entry of contaminants and the like. The liner may typically be a polyurethane cup. An actuator 20 is secured to lower table portion 30 and extends therebelow with the substantial portion of the actuator components being below lower table portion 30 as discussed hereinbelow. The portion of the actuator that extends above table portion 30 further extends into a well defined by liner 32 and may include an end-effector 34 mounted thereto, which may be, for example, as described in U.S. Pat. No. 5,427,363. When the actuator is in a retracted position, the well has sufficient depth such that the end-effector 34 does not extend above the plane of table top portion 28.

Figure 4:
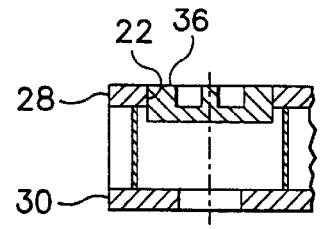
FIG. 4 is a sectional view of the table of FIG. 2 taken along line 4—4 illustrating the placement of a plug in the table aperture where an actuator is not presently positioned.

For table apertures 22 which do not currently have an actuator installed thereon, a plug member 36, illustrated in FIG. 4 in cross section, is inserted into aperture 22 to seal the interior portions of the table against entry of contaminants as well as to prevent contaminants from passing through the bottom portion 30 of the table into the space therebelow.

Referring now to FIG. 5, a cross-sectional view of a typical passive actuator, the actuator 20 comprises a main housing portion 42 which includes an upper flange area 44 for engaging with lower table portion 30 (FIG. 3). The main housing 42 is long in relation to its diameter, for example in a particular embodiment the main housing is approximately 24 inches long, while approximately 2-½ inches diameter. The housing is substantially hollow and receives a cylinder rod 46 in close fitting but sliding engagement with the interior of the housing. The cylinder rod is substantially surrounded near the upper portion of the main housing by a locking member 48, which is described in greater detail with reference to FIG. 6 hereinbelow. At the lower extent of cylinder rod 46, an air cylinder piston 50 is provided as described in greater detail with reference to FIG. 7 hereinbelow. Attached to the lower end of housing 42 is hydraulic intensifier 52, again, described in greater detail with reference to FIG. 7 hereinbelow. Mounted below the hydraulic intensifier are actuator valves 36, 38 and 40 which are operative to control the extension, retraction, locking and vacuum/positive air pressure application of the individual actuator internally. A hydraulic supply line 54, shown in phantom, extends from intensifier 52 up to locking member 48 via an internal portion of the body of the intensifier and the main housing, enabling a system with no external plumbing and hence no hoses or fittings to leak. In operation, the intensifier 52 is supplied air pressure and employs a relatively low pressure pneumatic input to intensify and create a much higher pressure hydraulic supply for governing operation of the clamping member 48.

Figure 9:
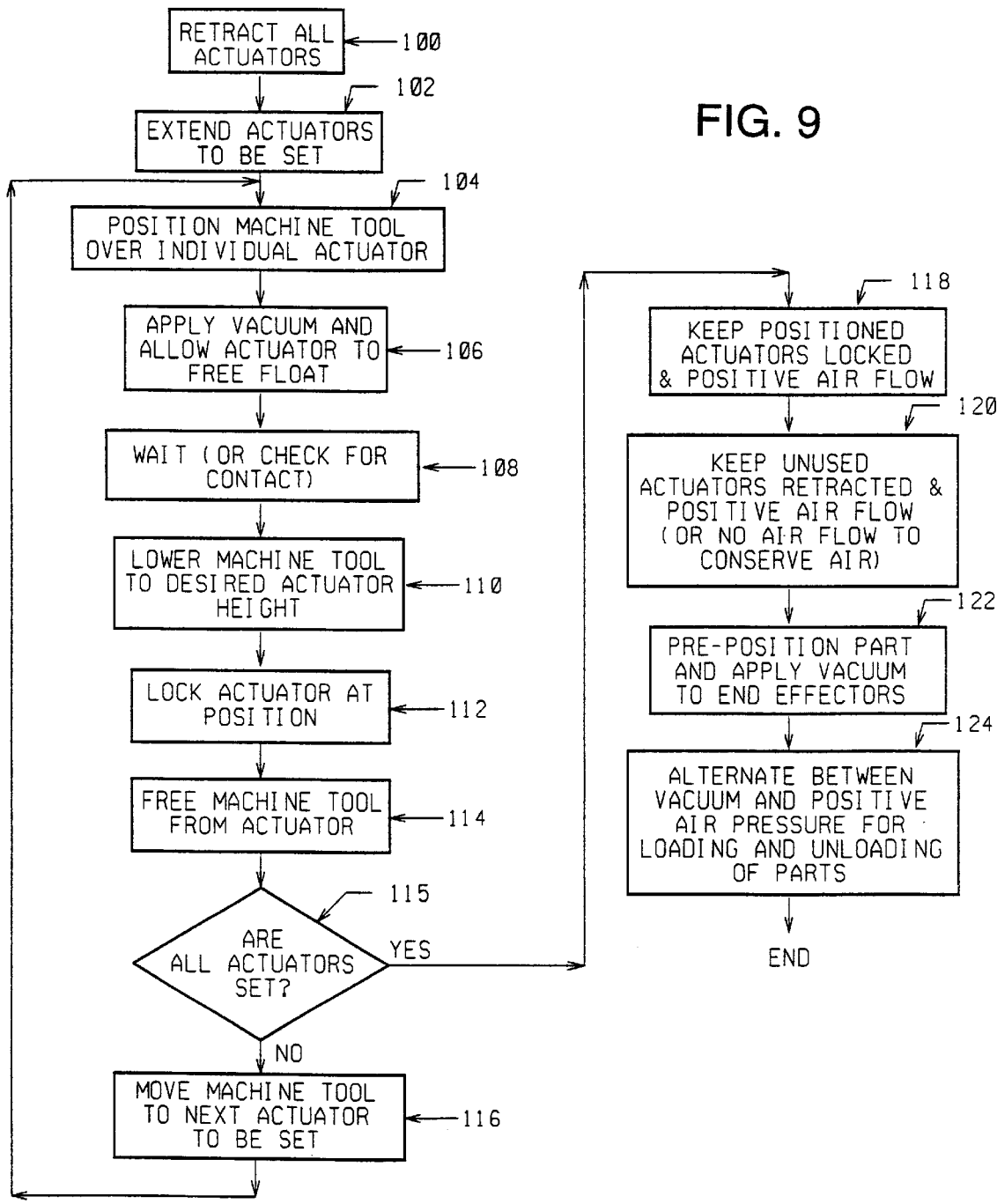
FIG. 9 is a flow chart of operational steps employing the flexible tooling system.

The actuator is deemed passive because it relies on outside means to accurately set the height of the actuator, for example, a machine tool as discussed in conjunction with FIG. 9 hereinbelow. With reference to FIG. 6, which is a more detailed cross-sectional view of the upper portion of the actuator housing and components therewithin, it may be observed that a locking sleeve 56 substantially surrounds cylinder rod 46. The locking sleeve may be securely engaged to the main housing by threading 58, for example, which is suitably provided in a recessed portion of the main housing. In a preferred embodiment, the locking sleeve is held in place with a retaining ring 69 (illustrated in phantom in FIG. 7), to assure that the sleeve does not come loose. The locking sleeve is substantially annular in shape and includes a thin annular clamping portion 60 which is adjacent cylinder rod 46 at least along an extent thereof. In the area where portion 60 is adjacent cylinder rod 46, a space 62 is defined wherein the space 62 receives hydraulic fluid therewithin. Accordingly, when pressure is applied to the hydraulic fluid 64, the locking sleeve portion 60 is caused to deform inwardly so as to firmly engage the rod 46, thereby preventing longitudinal movement of the cylinder rod. A spacer 66 is provided to substantially fill the majority of the volume of the aperture 62 so as to enable a minimal amount of hydraulic fluid to be necessary for causing deformation of portion 60. A purpose of spacer 66 is to compensate for the compressibility of the hydraulic fluid 64, since the volume of fluid is substantially reduced by the presence of the spacer. Upper and lower O-rings 68 and 70 provide seal between locking sleeve member 56 and the main housing, while O-ring 72 provides a seal for the retraction air pressure. It will be understood that cylinder rod 46 is substantially hollow within the interior. In an alternative embodiment, clamping portion 60 is in tight (interference fit) engagement with cylinder rod 46 in the absence of hydraulic pressure, and is caused to unclamp when hydraulic pressure is applied, thereby assuring that an actuator does not become unlocked on loss of hydraulic pressure. Further, an individual actuator (or the entire bed of actuators) can be disconnected from the various utilities (air, electric, control) and maintain the desired extension position. Such a configuration enables, for example, the system to be set up in a given place, and transported and used at another location.

Figure 7:
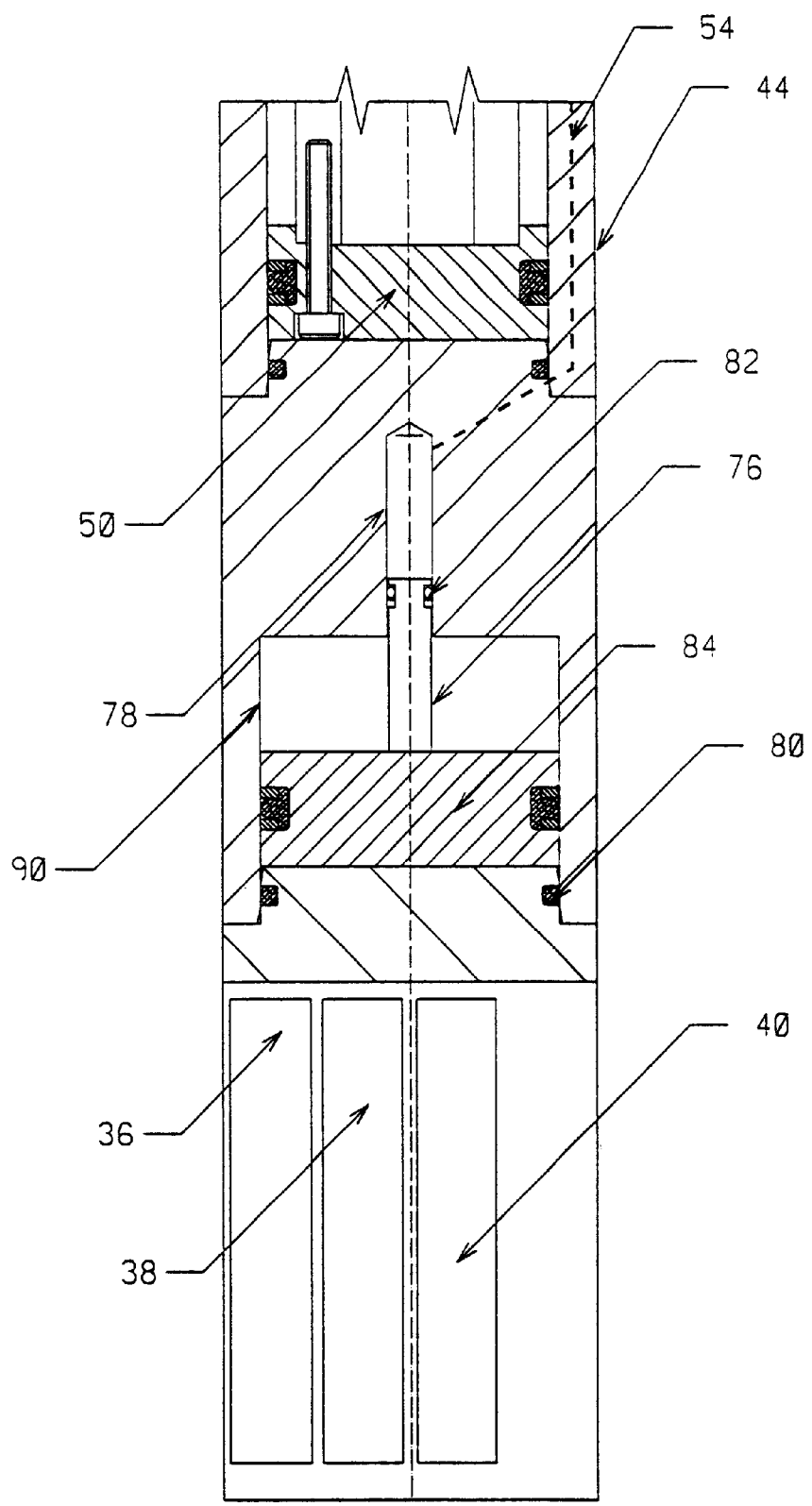
FIG. 7 is a more detailed cross-sectional of view the lower portion of the actuator of FIG. 5 illustrating a hydraulic intensifier used in conjunction with the locking mechanism of FIG. 6.

Referring now to FIG. 7, a more detailed cross-sectional view of the lower portion of actuator 20 illustrating the hydraulic intensifier used in conjunction with locking mechanism 48, as well as the placement of the operation valve, the intensifier body 52 mounts adjacent the lower portion of actuator housing 44. The intensifier comprises a piston rod 76 which is received by piston bore 78 centrally of the intensifier body. The piston 76 is relatively small in diameter compared to the overall diameter of the intensifier body. Intensifier piston 76 is slidably movable within cavity 78 and moves inwardly and outwardly in the cavity with movement of intensifier piston 84. Intensifier piston 84 is substantially larger than intensifier piston 76 and is slidably movable with piston bore 90, which is of fairly large diameter relative to the diameter of intensifier body 52. Both pistons 76 and 84 have respective piston seals 82 which enable movement of the piston within the piston bore while preventing loss of pressure around the outer edge of the piston. Piston 76 is mounted to and moves in conjunction with movement of piston 84 and is operative such that movement of the large piston 84 results in movement of the smaller piston 76. Since piston 76 fits within a much smaller bore 78, the relatively low pressure movement of piston 84 is intensified to a relatively high pressure within piston bore 78. Piston bore 78 is suitably filled with a hydraulic fluid and is in fluid communication with the chamber 62 surrounding the clamping portion 60 of clamping member 48.

Air pressure is supplied to operate piston 84 upwardly and downwardly via an air channel in the end cap 80, not shown. A check valve and orifice on the interior end of the end-effector provide a slow leak under pressure and high flow under vacuum, to enable pressure and vacuum to be supplied to any end effector mounted to the cylinder rod.

Extension and retraction of cylinder rod 46 is accomplished by powering piston 50. When air is supplied to the extend side of the piston, rod 46 extends and when air is supplied to the retract side of the piston, rod 46 retracts.

Figure 8:
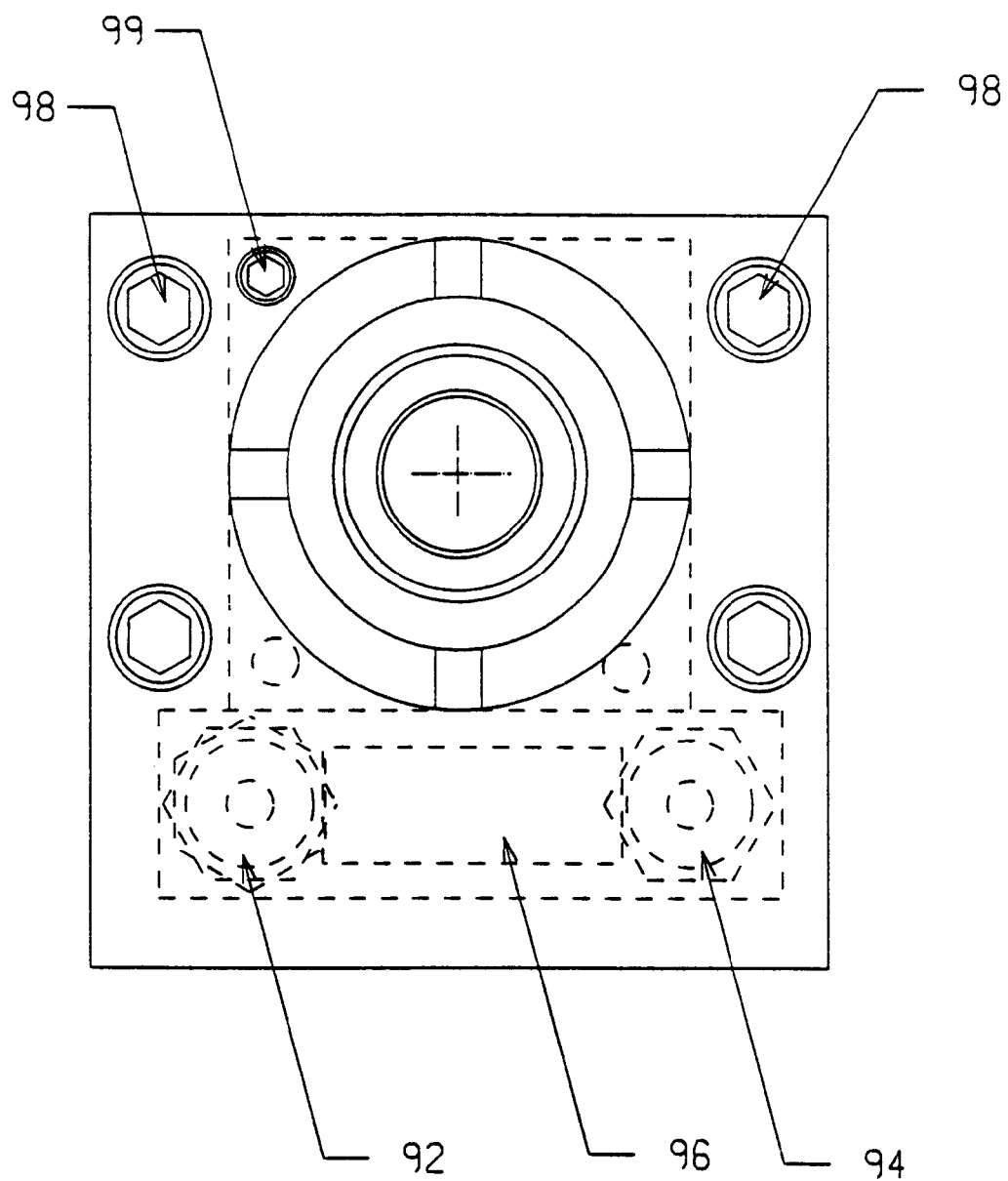
FIG. 8 is a top view of the actuator of FIG. 5, illustrating the various connections to an individual actuator.

Referring now to FIG. 8, a top view of an actuator as illustrated in FIG. 5, showing the attachment and various connections to the support table, pressure and vacuum connectors 92 and 94 are positioned in a portion of the flange of main housing 44 and electrical/bus interconnector 96 is positioned between the two connectors 92 and 94. Corresponding connectors are provided at each position of the support table so that when an individual actuator is inserted into an opening of the support table, the vacuum, pressure and electrical connectors mate with the corresponding connectors at the support table, thereby providing vacuum, air pressure and electrical supply and commands to the actuator. The air pressure and vacuum connectors at the support table are self sealing such that when no actuator is present, the air pressure and the vacuum supply are sealed at that connector to prevent loss of vacuum or air pressure. The actuator is suitably secured to its position at the support table via four mounting bolts 98 which are spaced in any suitable pattern to provide appropriate engagement with the support table. A hydraulic bleed port 99 is also provided to allow the hydraulic portion of the individual clamping member in a particular actuator to be bled to remove air from hydraulic system.

The operation of the system described hereinabove in a typical application would entail positioning actuators in the various apertures of the table portion configuration appropriate to support the part to be worked upon and then adjusting the height of individual actuators to provide an appropriately shaped support base. FIG. 9 is a flow chart illustrating operational steps for the system. Returning to FIG. 9, the sequence of operation for using the system is as follows: First, all actuators present in the system are retracted to their lowermost position (step 100). Then, those actuators which are to be used in the current setting are extended to the end of travel, suitably in a simultaneous manner (step 102). In a particular embodiment the extension distance of the surface of the table is eight inches, although this is not a requirement. A machine tool which is being used in conjunction with the flexible tooling actuators is then directed to position itself above the first actuator (step 104). The machine tool will typically have a flat plate-like attachment thereon and this flat plate-like attachment is lowered to be in contact with the vacuum cup of the end-effector of the first actuator. Vacuum is then applied to the end-effector by operation of valve 40 of FIG. 7 and simultaneously the extend operation is turned off (by actuation of valve 36) to allow the shaft of the actuator to free float (step 106). The operation of the vacuum then causes the actuator to be sucked up into contact with the flat portion of the machine tool. Next, an appropriate wait period is allowed to pass (step 108), for example, two seconds, for the appropriate seal to be made between the vacuum cup and the machine tool member. Alternatively, sensing may be provided to determine that contact between the machine tool member and the end-effector has been appropriately made. This sensing may include proximity detection or some other type of contact switch, for example.

Now, with the end-effector (and thereby the actuator) in firm engagement with the machine tool member, the machine tool is lowered to bring the actuator to the desired height setting (step 110). The locking collet member 48 of FIG. 6 is activated by operation of valve 38 of FIG. 7, whereupon the shaft of the actuator is firmly locked into position (step 112). A time delay may be observed to assure complete locking, for example one second. Next, the vacuum being supplied is removed, which causes air to blow back through the end-effector, providing release of the machine tool plate member and the end-effector (step 114). In the particular embodiment, this operation is performed by activation of a retract command (actuation of valve 40) which does not cause the actuator to retract because the locking member 48 of FIG. 6 is engaged, but instead causes vacuum to be removed. The machine tool then retracts away from the actuator and proceeds to the next actuator in the sequence of actuators to be set (decision block 115, step 116). Once arriving at the next actuator, the setting process is repeated. This process continues multiple times until all actuators are set.

Once all the actuators have been set to their desired height, each securement member for the actuators in use is locked and various actuators are blowing a small volume of air through their end-effectors (block 118). Those actuators which are not being used in the present configuration are all set to the retract state and are also providing a small volume of air through the end-effector (block 120). The part to be operated upon is then prepositioned above the support table and adjusted to be engaged by the support members in the appropriate positions. Once so positioned, the retract valve is turned off (valve 40, FIG. 7) which causes vacuum to be applied to the actuators which are in the extended position (step 122). Accordingly, the part being operated upon is held by the suction force as a result of the vacuum and the cup portion of end-effectors 34. Loading and unloading of subsequent parts to be operated upon is accomplished by alternating the retract state between ON and OFF (block 124) which alternates between vacuum being applied through the suction cup of end-effector 34 and air being blown outwardly through the suction cup, accordingly holding or releasing the part being operated upon.

An individual actuator as illustrated in FIG. 7 employs three valves 36, 38 and 40 which suitably comprise spring return single solenoid 3-way valves. Valve 36, denoted the extend valve, when in its ON state causes the actuator shaft to extend and when in its OFF state causes air to be dumped from the extend operation. Valve 38 controls operation of the clamping member of FIG. 6 and when in an ON state causes the clamping to occur and when in an OFF state removes clamping to allow the actuator to extend or retract freely. Valve 40 controls retraction (the retract valve). When in the on state, valve 40 causes the actuator to retract and also allows air to bleed through the end-effector, while in the OFF state causes vacuum to be applied to the back of the actuator and pulls vacuum through the end-effector. In a particular embodiment, each valve is a 24 volt DC solenoid. The state of the various valves during the operation described hereinabove with reference to FIG. 9 is illustrated in Table 1.

TABLE 1

| Step | Valve 36 | Valve 38 | Valve 40 |
| --- | --- | --- | --- |
| 100 | OFF | OFF | ON |
| 102 | ON | OFF | OFF |
| 104 | ON | OFF | OFF |
| 106 | OFF | OFF | OFF |

TABLE 1-continued

| Step | Valve 36 | Valve 38 | Valve 40 |
| --- | --- | --- | --- |
| 108 | OFF | OFF | OFF |
| 110 | OFF | OFF | OFF |
| 112 | OFF | ON | OFF |
| 114 | OFF | ON | ON |
| 116 | OFF | ON | ON |
| 118 | OFF | ON | ON |
| 120 | OFF | OFF | ON |
| 122 | OFF | ON | OFF |
| 124 | OFF | ON | ON/OFF |

In some applications, parts of the flexible tooling support system may be subjected to stress or dimensional changes caused by changes in temperature or applied forces. These applications include the formation of aircraft parts of composite materials at an elevated temperatures, and other processes conducted above or below room temperature. In such applications, the thermal expansion and contraction of the clamp parts and the actuator can cause the clamp to loosen its grip on the actuator or to bind, i.e., to fail to release the actuator when the actuating force applied to the clamp is removed. It is also desirable to avoid the use of hydraulics in a clamp that operates at high or low temperatures.

Figure 18:
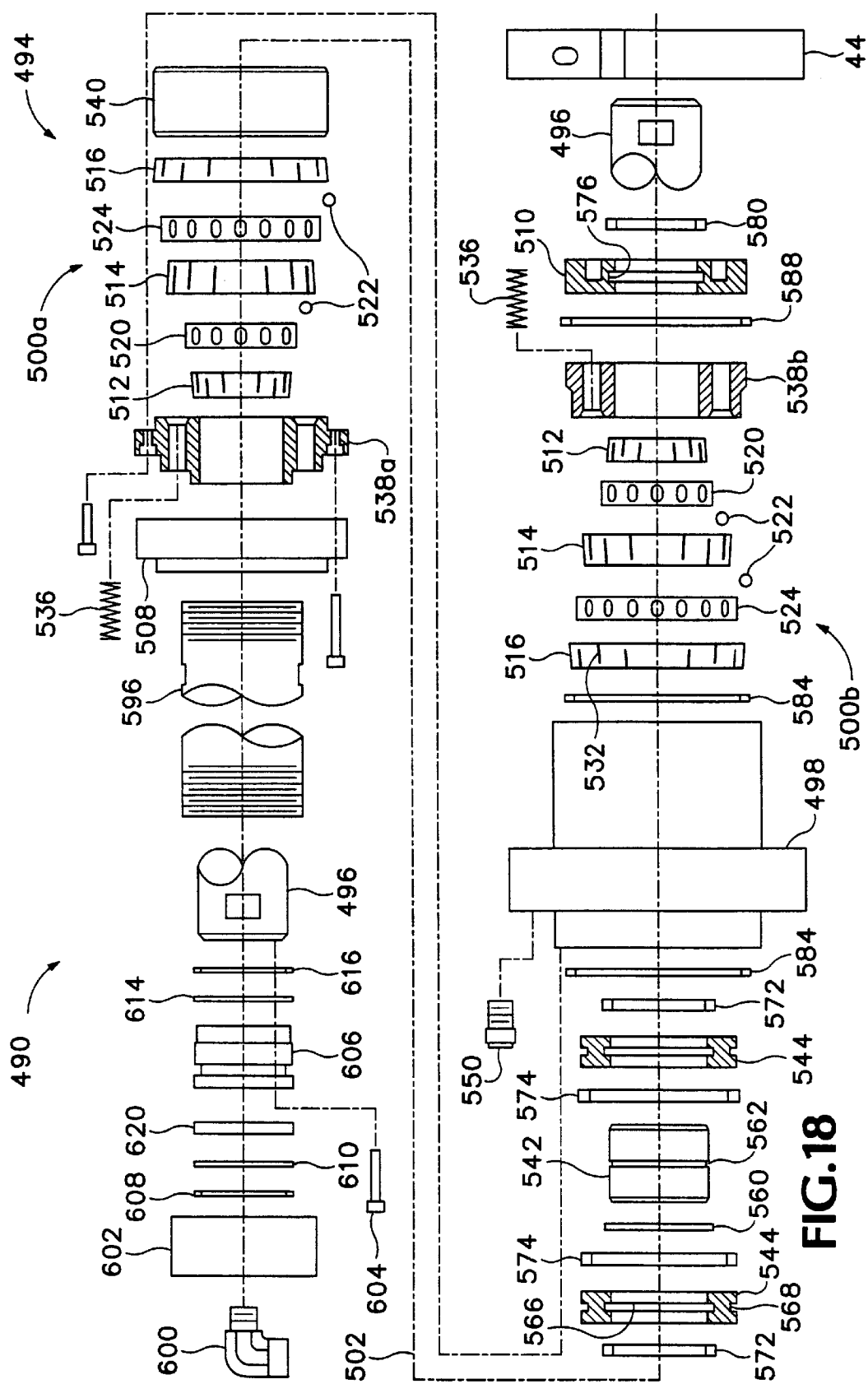
FIG. 18 is an exploded view of an actuator suitable for use at high temperatures.
Figure 19A:
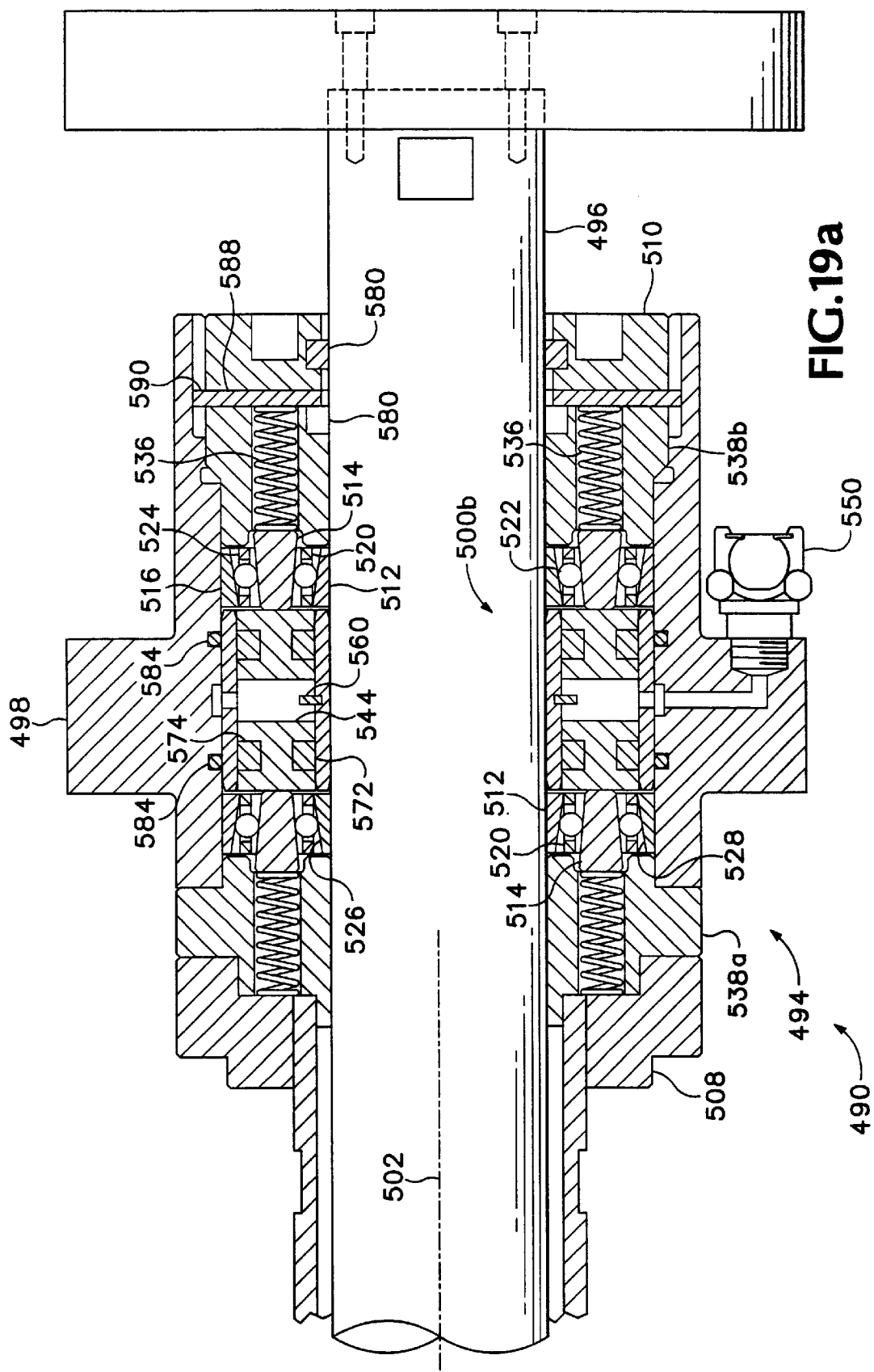

FIGS. 18, 19a, and 19b show an actuator 490 that employs a clamp 494 which securely fixes an extensible member, rod 496, with respect to a clamp housing 498, without the use of hydraulics. Clamp 494 will maintain a strong clamping action and release without binding, even at high temperatures.

A preferred clamp 494 comprises two essentially mirror-image clamp assemblies 500a and 500b, referred to generically as clamp 500, positioned along a clamp axis 502 and contained within clamp housing 498, a spring retainer 508, and a wiper housing 510. Each clamp assembly 500 includes an inner collet 512, a middle collet 514, and an outer collet 516.

Positioned between middle collet 514 and inner collet 512 is an inner cage 520 of ball bearings 522. Similarly, positioned between middle collet 514 and outer collet 516 is an outer cage 524 of ball bearings 522. Ball bearings 522 allow collets 512, 514 and 516 to adjust their relative position in response to forces caused by thermally-induced dimensional changes and stress while middle collet 514 is engaged, thereby preventing binding and allowing middle collet 514 to be disengaged to unclamp extensible member 496.

Inner collet 512 has a surface 526 that faces an opposing surface 528 of outer collet 516. One or both of inner collet 512 and outer collet 516 are preferably tapered in the same direction, i.e., both collets get thinner in the same direction along clamp axis 502, so that surfaces 526 and 528 form a wedge-shaped opening or gap into which ball bearings 522 are positioned and into which middle collet 514 is inserted.

The above-mentioned wedge-shaped opening is sufficiently wide to receive the narrow end of middle collet 514, but is sufficiently narrow that when middle collet 514 is pressed between inner collet 512 and outer collet 516, the clearance decreases to zero, i.e., when middle collet 514 is engaged. Upon further biasing of middle collet 514, inner collet 512 is forced by the ball bearings 522 in cage 516 against rod 496 and outer collet 516 is pressed by the ball bearings 522 in cage 524 against clamp housing 498. The directions of taper of inner collet 512, middle collet 514, and outer collet 516 in clamp assembly 500a are opposite to the directions of taper of the corresponding parts in clamp assembly 500b.

Each collet includes grooves 532 that enhance flexibility. The flexibility is thought to improve the ability of the collets to conform to the surfaces that they engage and also to aid in the prevention of binding. Preferred grooves are approximately 0.060 inches (1.5 mm) wide and are of a depth to provide a collet thickness of approximately 0.100 (2.5 mm) at the deepest part of the groove. About 16 grooves are equally spaced around each collet, between the contact points of ball bearings 522.

Although it preferable that inner collet 512, middle collet 514, and outer collet 516 all be tapered, skilled persons will recognize various other arrangements of clamping members and bearing elements can achieve the result without varying from the concept of the invention. For example, if only middle collect 514 is tapered, ball bearings 522 will still cause the extensible member to be clamped when middle collet 514 is engaged. Any arrangement of straight and tapered members in which a force applied to one member causes a second member to be pressed into the object to be clamped could be used. The tapered members need not be annular. It will also be apparent to skilled persons that the invention could function with two, instead of three collets, and that the outer collet 516 could be manufactured as part of clamp housing 498, preferably by preparing a surface on the inside of the clamp housing tapered in the direction opposite of that of the tapered middle collet 514.

In one embodiment, in which rod 496 has a diameter of approximately 2 inches (5 cm), ball bearings 522 are composed of 440 stainless steel and have a diameter of 3/16 inch (4.8 mm). Cage 520 and 524 each contain 16 bearings. Skilled persons will be able to select the size and number of ball bearings appropriate for different clamping applications.

Springs 536 mounted in a spring housing 538a (clamp 500a) and a spring housing 538b (clamp 500b) provide a sustained biasing force against middle collet 514 to maintain a clamping force to fix the position of rod 496. Thus, middle collet 514 will be maintained in the engaged position in the absence of any outside force and clamp 500 operates in a normally closed manner. Springs 536 provide a sustained biasing force, regardless of dimensional changes in the clamp components caused by thermal expansion, because springs 536 compensate for dimensional changes by changes in their length, with minimal effect on the biasing force.

Springs 536 provide a mechanical, as opposed to a hydraulic or pneumatic, biasing force, thereby simplifying the construction, reducing the cost, and improving the reliability of clamp 500, particularly at elevated temperatures. Although coil springs are preferred for use in the invention, other types of biasing elements that could be used include other known types of springs or electromagnetic, electromechanical, hydraulic, or pneumatic mechanisms.

A clamp release mechanism for selectively releasing clamp 494 by overcoming the biasing force of springs 536 will now be described. An outer sleeve 540, together with an inner sleeve 542 and two ring actuators 544 define an annular space 548. When compressed air is applied through fitting 550 to annular space 548, ring actuators 544 move in opposite directions along clamp axis 502. Each ring actuator forces one of the corresponding middle collets 514 against springs 536, overcoming the spring force and moving middle collets 514 into disengaged positions, in which they no longer press inner collets 512 against rod 496, freeing it to extend or retract.

Middle collet 514 is thus displaceable along clamp axis 502 between an engaged position and a disengaged position. In its engaged position, middle collet 514 presses inner collet 512 and outer collet 516, through ball bearings 522, to apply a clamping force to fix the extension of rod 496 as described above. In the disengaged position of middle collet 514, rod 496 is free to change positions. Skilled persons will recognize that the difference between the engaged and unengaged position is the presence or absence of a clamping force, and that the actual movement of middle collet 514 between the engaged and disengaged position can be minimal, even zero, in which case the engaged and disengaged positioned define states rather than different locations in space.

Because springs 536 in clamp assembly 500*a* provide a biasing force in a direction opposite to that of the biasing force of the springs in clamp assembly 500*b,* compressing the air in the single annular space 548 between the clamp assemblies is adequate to provide force in the correct direction to counter the bias forces of the springs in both clamp assemblies 500*a* and 500*b*. Although a pneumatically operated clamp release mechanism is preferred at elevated temperatures, the biasing force could also be overcome using electrical (including electromagnetic and motor), mechanical, or hydraulic means without deviating from the scope of the invention.

When positioning actuator 490 during operation of the flexible tooling system, air pressure is applied to annular space 548 to release clamp 494. Actuator 490 is then adjusted to the correct height. Air pressure is then released from annular space 548, allowing springs 536 to bias middle collet 514 into engagement between inner collet 512 and outer collet 516, thereby clamping actuator 490. A retaining ring 560 fits into groove 562 on the outer surface of inner sleeve 542 to maintain separation of ring actuators 544 when compressed air is not being applied to annular space 548.

Each ring actuator 544 includes an inner groove 566 and an outer groove 568, which seat an inner sleeve seal 572 and an outer sleeve seal 574, respectively. Inner sleeve seal 572 provides an airtight seal against inner sleeve 542 which extends through ring actuators 544 and outer sleeve seal 574 provides an airtight seal against outer sleeve 540. Wiper housing 510 includes an inner groove 576 that seats a wiper seal 580 that seals against rod 496. Two o-rings 584 fits between outer sleeve 540 and clamp housing 498 to prevent loss of air pressure between fitting 550 and annular space 548. A retaining washer 588 positioned between spring housing 538*b* and wiper housing 510 provides a bearing surface for springs 536. Retaining washer 588 includes tabs 590 that prevent its rotation by mating with grooves on the inner surface of clamp housing 498.

FIG. 19*b* shows a mechanism for extending rod 496 to the proper position to support the work piece. In a preferred embodiment, rod 496 is oriented vertically and will lower under its own weight when clamp 500 is released, without the necessity of providing an additional mechanism to retract the rod. Rod 496 is preferably made of a material, such as Invar, that has a small or negligible thermal coefficient of expansion.

Rod 496 is extended by compressed air that enters rod housing 596 through a fitting 600 in an end cap 602 and forces a pneumatic piston 606, to which rod 496 is bolted by bolts 604, though rod housing 596. O-ring 608 seals between end cap 602 and rod housing 596, and o-ring 610 provides a bumper to prevent piston 606 from contacting end cap 602. O-ring 614 provides a seal between rod 496 and piston 606, and o-ring 616 provides a bumper for piston 606 at its fully extended position. A seal 620 surrounds piston 606 to form an airtight seal with rod housing 596.

Although clamp 500 is described above as used in a preferred embodiment of a passive flexible tooling system, clamp 500 has several novel aspects and could be used in a variety of applications. The two mirror-image clamp assemblies 500*a* and 500*b* provide a strong clamp force with a single clamp release mechanism. The use of three collets, as well as the use of a bearing member between collets, prevents binding of the clamp when dimensions of the clamp assembly change due to temperature changes or stress.

The biasing force of springs 536 is relatively insensitive to thermally-induced dimensional changes of clamp 500 components, which may cause minor changes in the length of springs 536. The purely mechanical biasing action of springs 536 ensure that clamp 500 will not fail, even upon the interruption of electrical power or compressed air, and the absence of a hydraulic system makes clamp 500 suitable for use in high temperature applications.

Moreover, although clamp 500 is described in an embodiment that uses cylindrical collets to clamp a cylindrical rod, skilled persons will recognize that the invention is not so limited. Various tapered and untapered elements could be used in place of the collets, and other bearing elements, such as bushings and tapered or untapered roller bearings, could be substituted for the ball bearings without deviating from the inventive concept. Suitably, a clamp of the present invention could be used to clamp objects in many applications, at various temperature ranges, in addition to its use in flexible tooling systems.

Figure 10:
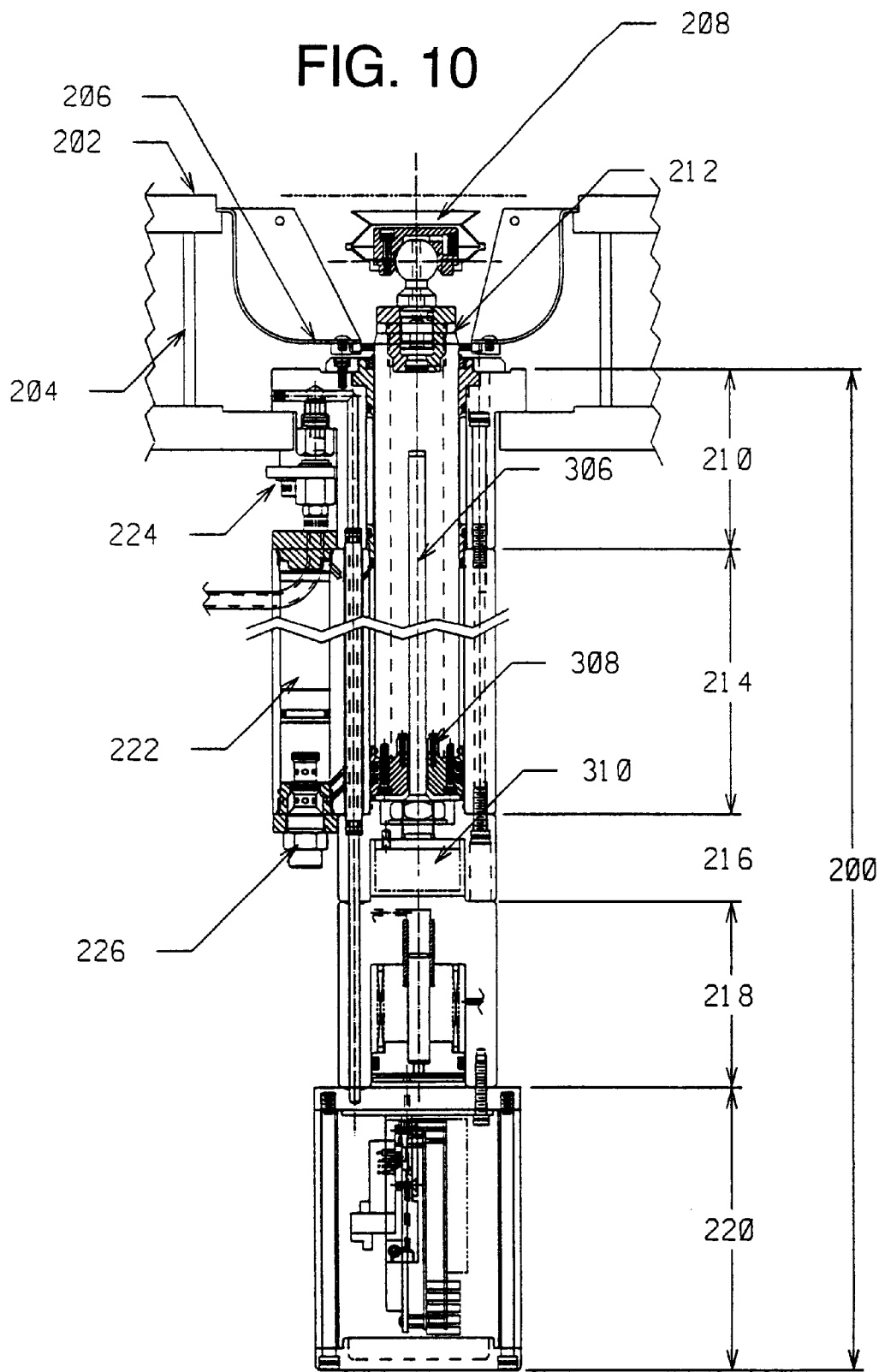
FIG. 10 is a partial cross-sectional view of an actuator according to an embodiment of the present invention employing active positioning.

Referring now to FIG. 10, a side partially cutaway view of an active actuator system according to the present invention, the features and operation thereof will be described. Operation and structure of some components of the active actuator system correspond to similar components of the passive actuator system. The active actuator system 200 is employed in conjunction with a table 202 which corresponds to the table 12 of the passive actuator embodiment described hereinbefore and includes an actuator well 204 which receives the actuator therein and may include a seal 206 to keep contaminants from entering below the table and contaminating components of the actuator. An end effector 208 is positioned at the end of the actuator body and in the illustration of FIG. 10 employs a swivel head vacuum clamp member. The active system comprises a number of main components, including clamp body 210 which is operative to clamp and unclamp the stroke rod 212, for holding the stroke rod in a desired position as well as for halting upward or downward movement of the stroke rod at a precise position. An actuator cylinder body member 214 supports the stroke rod 212 as well as the various plumbing and electrical members as discussed herein. A top view is provided of the cylinder body member 214, which is suitably formed as an extrusion and then cut to the desired length (determined by the stroke length of the actuator), in FIG. 11 and is discussed hereinbelow. A linear transducer 216 is provided within the actuator system to accurately describe the current extended position of the stroke rod, while mounted therebelow is an intensifier 218 which operates in a corresponding manner to the intensifier described hereinbefore with reference to FIG. 7. The intensifier thus employs a relatively low pressure pneumatic supply to intensify a relatively small volume of hydraulic fluid, e.g. oil, to provide a high pressure clamping force for the clamp body 210. Mounted below the intensifier is valve and controller body 220 which includes solenoid valves for switching the flow of pneumatic and hydraulic supply for directing the up-and-down and clamp-and-unclamp operations of the system. A controller is also provided which receives commands from a central control over a network (see FIG. 16) to position the stroke rod to the desired height for operation and governs operation of the solenoids to accurately position the actuator. The system also includes an oil reservoir 222 which stores the hydraulic fluid and which also, as governed by speed valve 226, enables a flow rate to be modified to change the speed at which the stroke rod 212 extends or retracts.

Figure 17:
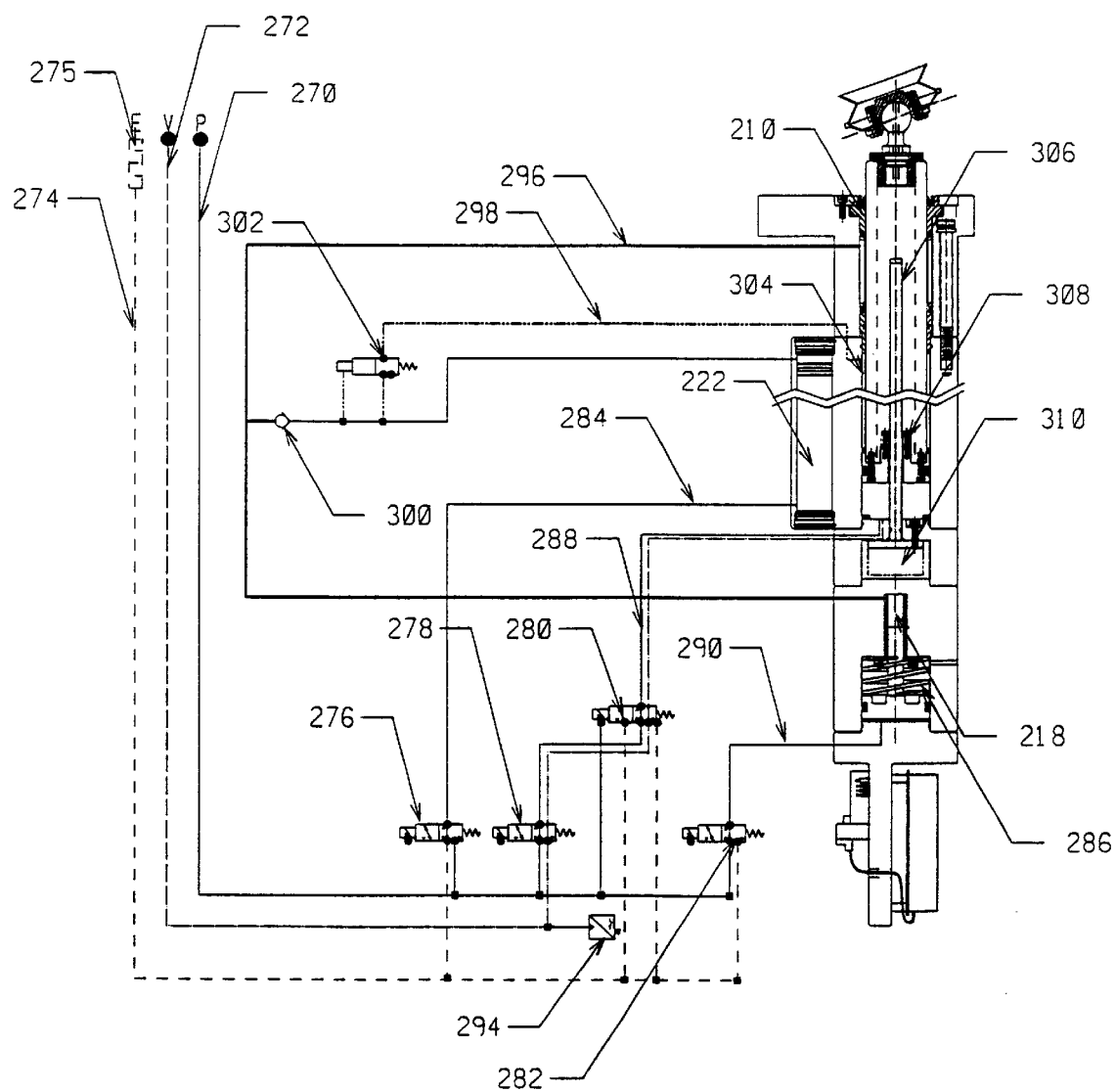
FIG. 17 is a diagram illustrating the pneumatic/hydraulic circuits which enable extension/retraction and other operations by the actuator as well as clamping of the clamp body member.

Referring now to FIG. 17, a pneumatic/hydraulic diagram illustrating the various circuits thereof which enable extension and retraction of the actuator, the operation thereof will now be described. Referring to FIG. 17, the system comprises a pneumatic supply line 270 which supplies air under pressure, a vacuum supply line 272 which supplies vacuum and an exhaust line 274 which exhausts air pressure as appropriate during operation. A muffler 275 may also be included on the exhaust line to muffle exhaust noise. The vacuum and air pressure lines 272, 270 are suitably provided as noted hereinabove to an operational table wherein an individual actuator connects via a coupling to each of the vacuum and pressure supplies. The pressure supply line 270 is further connected to various solenoids, including the retract and speed control solenoid 276, the vacuum/pressure solenoid 278, the extend solenoid 280 and the intensifier solenoid 282. From the other side of solenoid 276, air pressure is supplied to oil reservoir/accumulator 222 via accumulator pressure line 284. Air pressure from vacuum/pressure solenoid 278 is further provided to the extend solenoid 280 and air pressure as output by solenoid 280 is provided by rod extension line/actuator vacuum line 288 to the actuator for governing extension thereof. Intensifier solenoid 282 supplies air pressure to the extend side of the extend side of the intensifier circuit via intensifier extend line 290. A return spring 286 causes the intensifier to retract in the absence of extension pressure. Vacuum is distributed by solenoid 278, as further supplied through solenoid 280 and supplied as rod extension line/actuator vacuum line 288 to the actuator system. Vacuum is also supplied to vacuum pressure transmitter 294 which detects an existence of vacuum, for control system logic and the like.

Each actuator unit, which as noted hereinbefore is adapted for insertion and removal at individual sites on a table and essentially self-contained, includes its own self-contained hydraulic system which suitably employs oil as a hydraulic fluid. The hydraulic system includes both a high pressure hydraulic system 296 illustrated in bold lines in FIG. 17 and a low pressure hydraulic system illustrated in semi-bold lines 298. Pressure for the high pressure hydraulic system is generated by the intensifier circuit 218 wherein the high pressure is supplied to the clamp body 210 for controlling clamping as discussed hereinbelow. The low pressure oil system is supplied by oil reservoir 222, pressure being generated by air pressure line 284, and is further connected to a fill check valve 300, with the high pressure oil system also connected to the check valve. Accordingly, since the high pressure system operates on a very small oil volume, while the low pressure system employs a much greater oil volume, the accumulator/oil reservoir 222 is suitably able to resupply oil to the high pressure system via the check valve. Since the high pressure system is not always at high pressure, but only during certain clamp operations as discussed hereinbelow, when the high pressure side is at a low pressure, oil from the accumulator is allowed to resupply the high pressure side via the check valve. However, the check valve prevents the high pressure circuit oil from traveling backwards to the low pressure side. Thus, the individual actuator is somewhat self-contained and only need be resupplied with oil (via replenishing of the oil reservoir 222) on rare occasions or during routine, infrequent maintenance. The low pressure side includes a speed control valve 302, corresponding to valve 226 of FIG. 10, which further connects the low pressure system to a dampening system 304 which is operative to provide extend/retract dampening. In operation, the speed control valve 302, as directed by the valve controller circuitry 220, is either in a high or low flow speed mode. In the high flow speed mode, the oil is able to relatively freely flow between the accumulator and the dampening volume space 304. However, in the low speed position, since the valve is ground to provide a precise known leak rate, the transfer of oil between the accumulator and the dampening space is at a slower rate. Accordingly, the actuator extends at a much slower rate. Any contamination which may collect in speed valve 302 during its slow or closed state is suitably swept away when the valve opens to its high speed state, effectively flushing the valve and preventing its becoming clogged by buildup of contaminants.

As also mentioned herein with reference to FIG. 10, the active actuator system includes a linear transducer 306 therein which, in conjunction with annular magnet 308 and circuit board 310, generates a position signal provided to the controller. The magnet 308 extends and retracts along the length of transducer 306, generating a signal which is interpreted by circuit board 310 to indicate the position of the magnet. Since the magnet is secured to the actuator piston, it thus indicates the amount that the piston is extended. The transducer, magnet and accompanying circuit board are preferably manufactured by Balluff Incorporated of Germany.

In operation, the system causes extension and retraction of the actuator cylinder by appropriate operation of the solenoids and subsequent application of vacuum or air pressure. The extension is controlled somewhat by the dampening circuitry 304 wherein as the rod extends, the volume of area 304 is reduced and excess oil is displaced through speed control valve 302 into accumulator 222. The extension speed is governed precisely by whether the speed control valve is in its fully open position or in the closed/controlled leak position. In the preferred embodiment, retract is always at the fast flow rate. Thus, in operation, the actuator is extended a substantial distance at high speed and then, when within for example one-half inch of its final destination, valve 302 is operated to switch to slow speed, whereupon once the desired location is reached, then solenoid 282 is operated so as to cause the intensifier to retract, reducing the oil pressure in the high pressure oil line 296 which thus allows the clamping member to relax to its clamped position, securing the actuator rod at its desired position.

The clamping member comprises a hydraulic collet in interference fit with the extension rod (0.0015 inches). The collet is mildly heated to, for example, 300 degrees, to initially slip it onto the shaft. O-rings on the inside of the collet at both ends enable introduction of high pressure oil to the inside of the collet. A pair of O-rings on the outer diameter with a hole through to the inner diameter provide the path in for the oil. Applied pressure expands the collet, with the normal state of the collet locked. Alternatively, a normally unlocked collet may be used as previously described.

When movement of the rod is desired, then the intensifier is caused to extend, thereby raising the oil pressure in line 296 which causes the clamp member to expand outwardly thus enabling the actuator to move upwardly or downwardly, since the clamp member is in an interference fit with the rod during those times at which the intensifier is not supplying pressure to the high pressure oil line. Once the actuator rod is appropriately positioned, a determination may be made via a linear transducer whether the rod actually was positioned within a desired tolerance range. If desired, it is possible in accordance with the present invention to unclamp the rod and then reposition. Positioning accuracy is further enhanced by calibration on an occasional basis, to determine the time required for clamping to be effective. Thus, to calibrate the system, the actuator is caused to move (suitably at low speed, for increased accuracy) and the clamp command is given while simultaneously measuring the actuator's position as reported by the linear transducer. Then, the final position of the actuator is read from the transducer after the actuator stops moving and the difference between the position when the clamp command was given and the actual clamped position is determined and factored in for future clamping commands, so that the clamp command is given at the appropriate time.

Once clamped in position, then vacuum may be supplied by operation of solenoids 278 and 280 wherein a check valve is provided to the interior of the piston rod so as to provide vacuum up through the center thereof to the end effector as desired for securing via suction, any work piece being secured against the end effector.

The intensifier operates in a manner corresponding to that as discussed hereinabove with reference to FIG. 7, in the passive embodiment.

Figure 11:
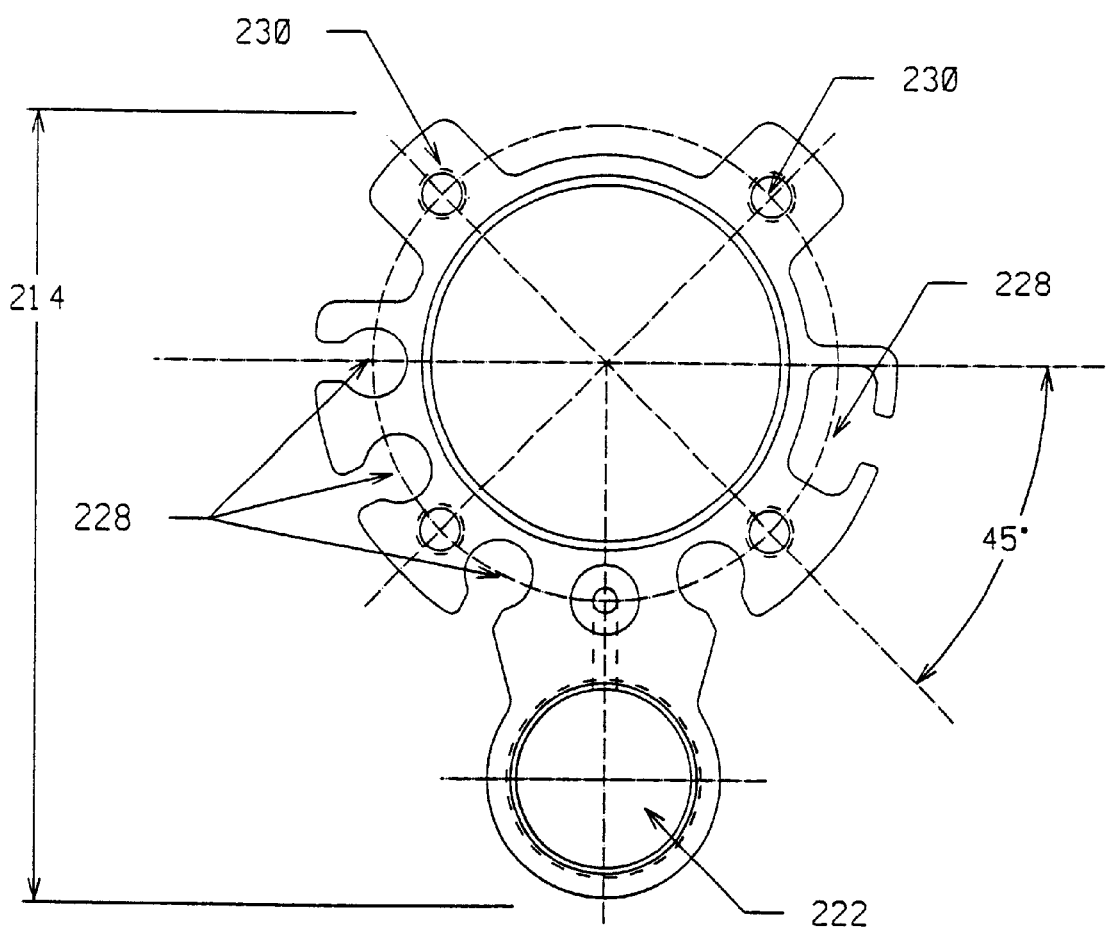
FIG. 11 is a top view of the cylinder body of the actuator of FIG. 10.

Referring now to FIG. 11, which is a top view of the cylinder body of the actuator of FIG. 10, it may be observed that in cross section the actuator body is somewhat annular in configuration with the addition of the oil reservoir 222. About the periphery of the cylinder body are a series of openings 228 which are provided to pass electrical cables and air/vacuum/oil tubes along the extent of the body. Four openings 230 are provided to receive fasteners for securing other pieces of the system thereto.

Figure 12:
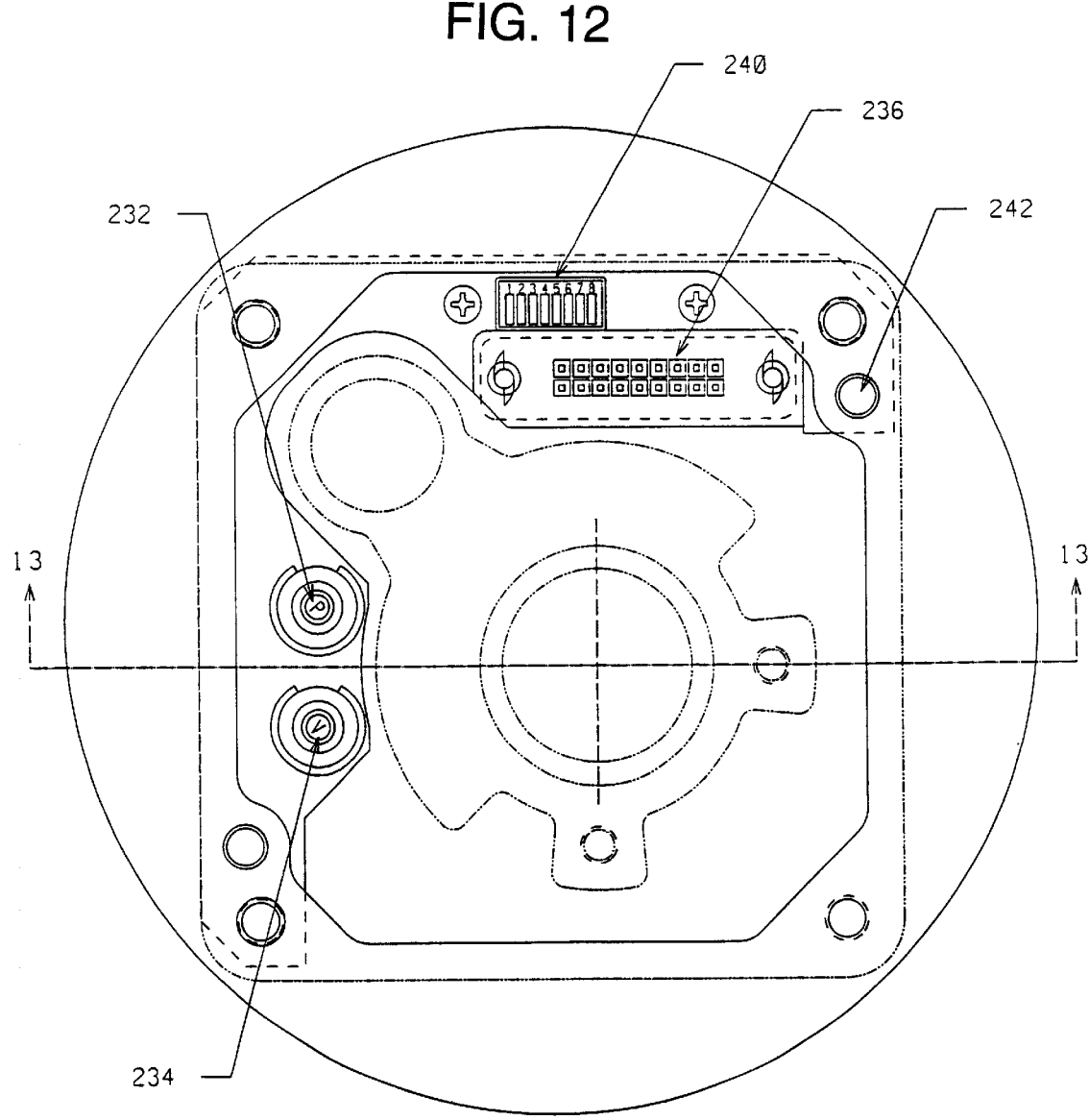
FIG. 12 is a top view illustrating the specific connections provided in the table for receiving the actuator.

Referring now to FIG. 12, which is a top view of the interface portion 224 of a table which receives and connects with an individual actuator, the air pressure is provided via a coupling 232 while vacuum is provided to coupling 234. Both couplings are connected to respective pneumatic and vacuum supplies which are suitably provided at each position on the table suitable for receiving an actuator therein. The couplings are normally closed when not connected to an actuator such that no air or vacuum leak occurs in table positions which do not have actuators placed therein. An electrical interface 236 is also provided and suitably provides ground, power, and twisted pair communication for RS-485 or other multi-drop network communication standard. Corresponding connectors are provided on the actuator which mate with couplings 232 and 234 and electrical connector 236 such that when the actuator is positioned and lowered into the table, couplings 232 and 234 and connector 236 interconnect with their corresponding parts on the actuator itself. Both connectors 234 and 232 as well as the electrical interface 236 are mounted in a "floating" fashion such that longitudinal and lateral movement is allowed (X—Y) to accommodate slight misalignment as the actuator is inserted into the table. This ensures that the actuator does not bind or become misaligned so as to damage the connector or not properly seat in the table. An addressing means 240 is also provided, which in the illustrated embodiment comprises an eight position DIP switch. The address of the individual table position is accordingly set by operation of the switches on the DIP switch. Accordingly, the RS-485 address of this particular table position may be uniquely set at installation time. Thus, an actuator may be moved from any position on the table to any other position on the table without the need for reprogramming of the actuator, since each individual table position has its own unique address. The RS-485 standard enables up to 256 addresses on an individual bus. Since a particular application of the present invention employs up to 1200 or more table positions, multiple hubs are employed, each hub having no more than 256 individual table positions addressed thereon.

Figure 13:
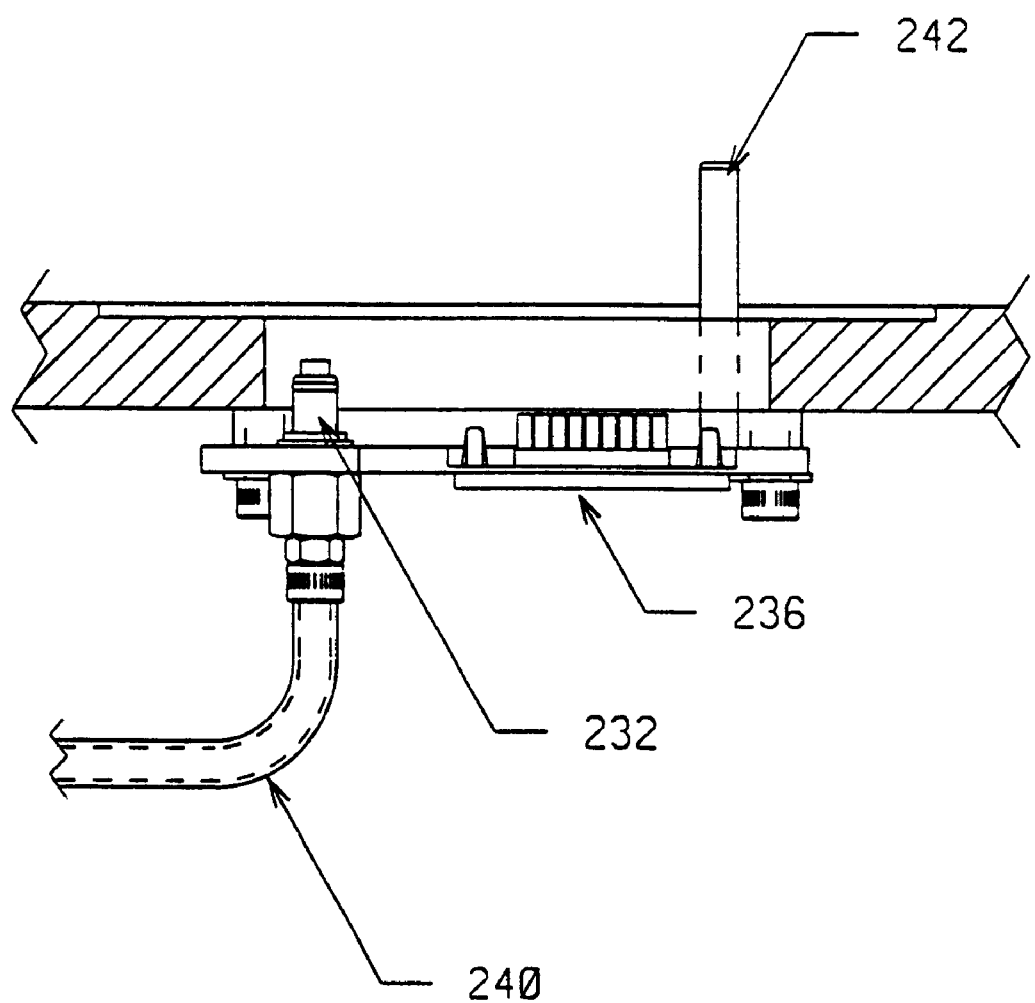
FIG. 13 is a side view illustrating features of the actuator receiving site of an actuator table according to the present invention.

Referring now to FIG. 13, which is a side view of the table insert position of FIG. 12, partially cut away taken along line 13—13 of FIG. 12, the position of air connector 232 may be observed as well as electrical connector 236. Pneumatic supply to connector 232 is provided via a pneumatic hose 240 which is supplied by an external pneumatic supply source. A dowel portion 242 is provided at the table position and extends upwardly a distance above the plane of the position and provides an alignment pin for engaging the actuator (which has a corresponding recess) as it is lowered onto the table position, assisting in guiding the actuator to the proper seating thereof.

Figure 16:
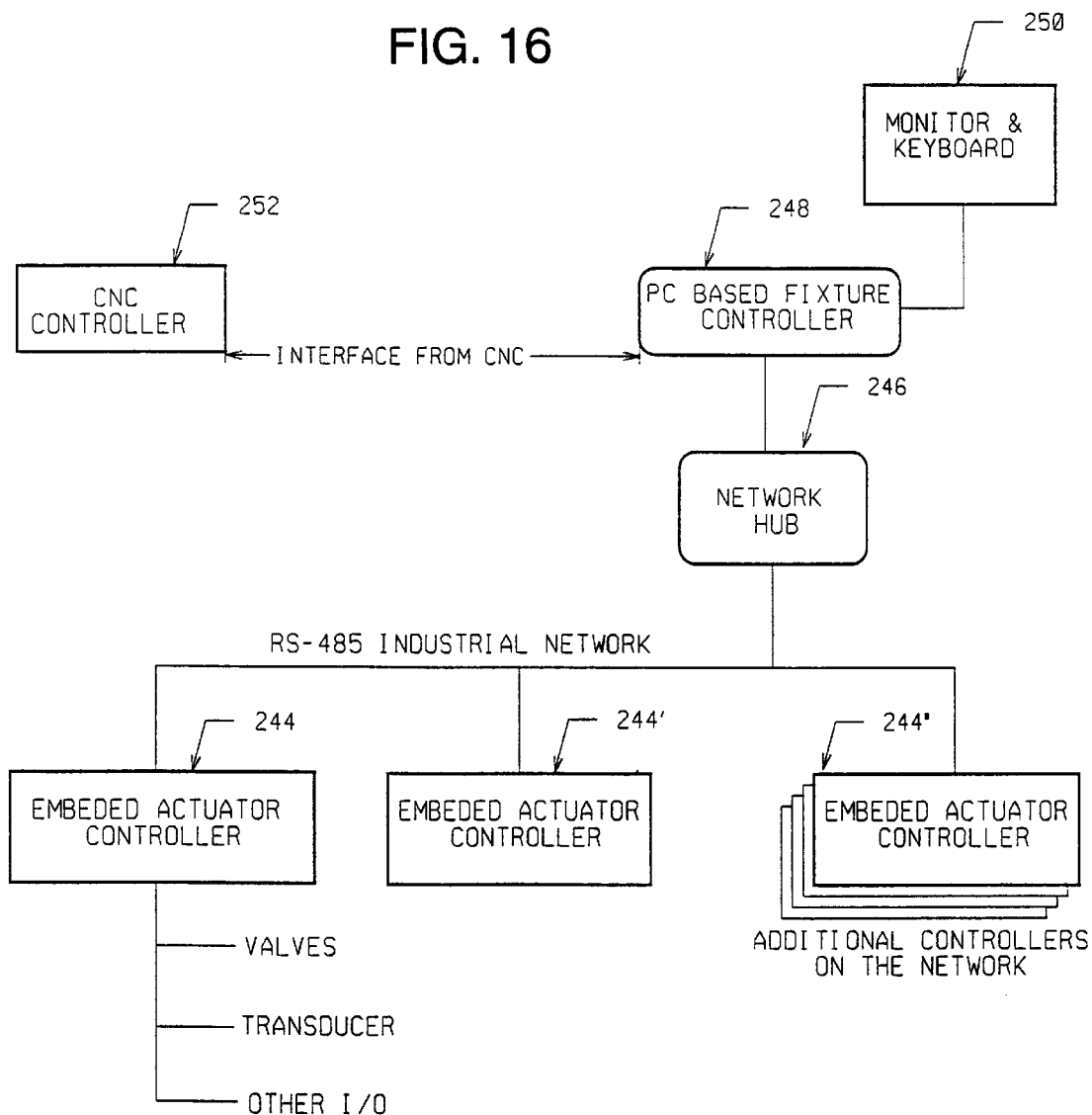
FIG. 16 is a block diagram of a typical system employing the active actuators of the present invention.

Referring now to FIG. 16, which is a block diagram of a particular architecture employed in controlling the operation of a system according to the present invention, each individual actuator has its own dedicated controller 244 with other controllers for other actuator positions designated 244', 244". Since a given system may employ many actuators, each with its own controller, hundreds of controllers may exist on the network, with up to 256 on each individual network hub. One network hub is illustrated (246) in the embodiment of FIG. 16. Referring again to an individual embedded actuator controller 244, connected thereto are the valves, transducer and the ability for any other I/O device as needed. As noted hereinbefore, each embedded actuator controller 244 is connected to a network hub 246, wherein plural network hubs 246 are interfaced with a personal computer based controller 248 which includes monitor and keyboard 250 for directing operation of the system. The PC controller 248 is further suitably interfaced with, for example, a CNC controller 252 which is operative to direct a machine tool or the like to perform operations on the work piece being held by the flexible tooling system of the present invention. Since each RS-485 network allows a maximum of 256 separate addresses, the PC controller 248 is programmed to know that, for example, the multiple network hubs are configured as banks of up to 256 positions each, such that, for example, actuator position number 741 on a given table would be on network hub 3, for example. Accordingly, any command to that position of the table would be sent to network hub 3.

Figure 14:
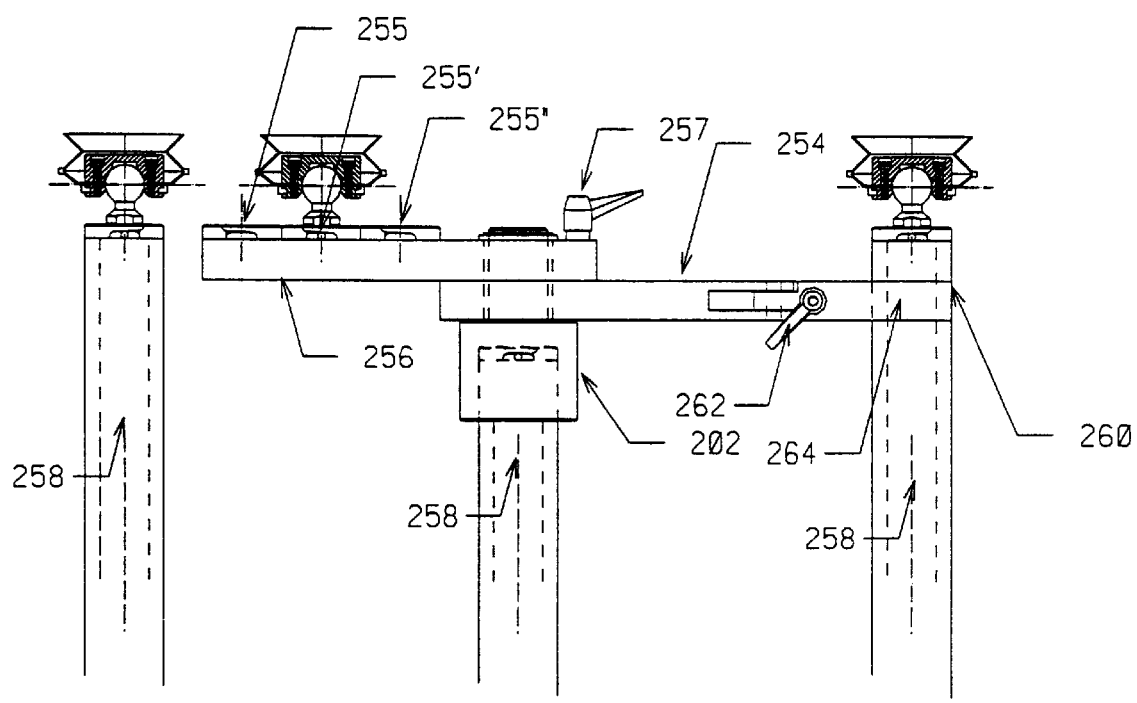
FIG. 14 is a side view of a portion of a table with actuators installed thereon, illustrating an extension mount employed with the present invention.
Figure 15:
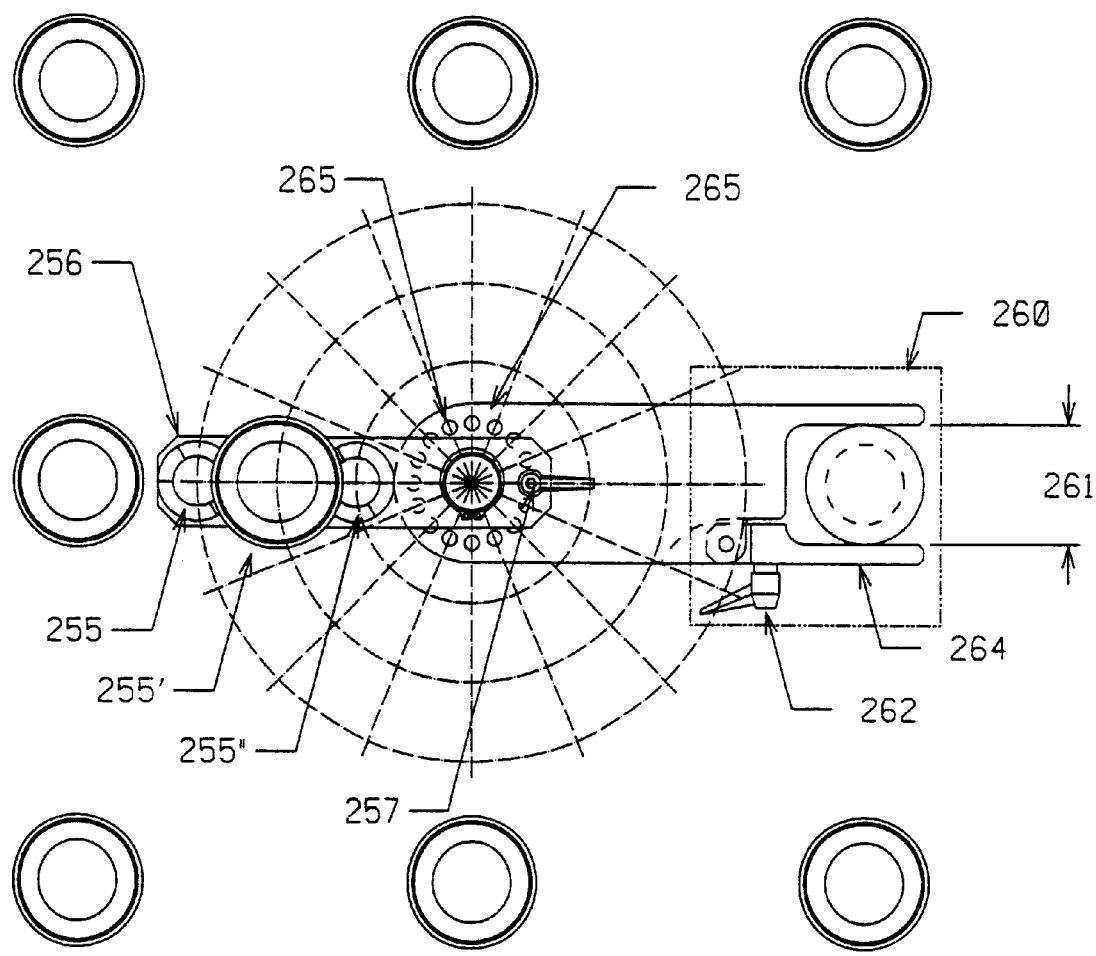
FIG. 15 is a top view of the extender of FIG. 14 as installed on an actuator table, illustrating the placement and positional movements thereof.

Referring now to FIGS. 14 and 15, which comprise side and top views respectively of an extension attachment which allows spacing of an actuator intermediate between two fixed locations, it will be observed that, in the preferred embodiment, a table has a series of fixed spaced locations which are adapted to receive actuators therein. However, it is possible that a particular application might require extra support between two given fixed table locations. Accordingly, referring to FIG. 14, an extender attachment includes first and second arm portions 254 and 256, wherein the first arm extension fits in engaging relation over a given actuator 258 above the table 202. The attachment is via a bayonet type mount which fits over the actuator piston body as extended. The first arm 254 extends from the actuator position to which attachment is made to an adjacent actuator and includes a clamp 260 which is secured and loosened by a tightening arm 262. Referring to FIG. 15, the clamp portion 260 includes a slot portion 262 which fits over the adjacent actuator and a finger portion 264 which, when tightened by operation of arm 262, provides a brace against rotation of the arm portion 254, so that the position of the extended actuator head is precisely maintained. Positioned every 22.5 degrees in the illustrated embodiment are locator holes 265, formed in the top of arm portion 254. The corresponding arm portion 256 has a cam lock expanding locating pin 257 which is adapted to mate with the corresponding hole 265 and, upon turning of a tightening lever, securely engaging the locating pin with its respective radial hole. Arm portion 256 includes three separate receiving positions 255, 255' and 255" which are spaced successively further from the mount position of the extender arm providing three separate radial locations along which an end effector may be positioned as illustrated in FIG. 15, every 22.5 degrees. Each individual site 255 also provides vacuum supply to the end effector and includes a check valve to prevent vacuum leak when that individual site is not in use.

An advantage provided the by flexible tooling system is that the support table need not be fully populated with actuators, since the actuators may be moved to different positions on the support table. Accordingly, the system flexibility is high, enabling multiple configurations, while not requiring the expensive of fully populating the table. Further, each actuator is essentially self contained, requiring only air, vacuum and electrical supply as well as instruction data. No external oil lines are required as the oil system is fully self contained. The construction is free from servo type components, allowing low current consumption, which simplifies the electrical supply demands made by a table populated with a large number of actuators.

While plural embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. In an adjustable work piece support fixture suitable for use at elevated temperatures and including multiple extensible members that extend variable distances above a plane to support a work piece of irregular shape, a clamping apparatus for fixing the extension of an extensible member comprising:

a clamp housing through which the extensible member extends;

a middle collet surrounding the extensible member and positioned within the housing;

an inner collet positioned between the middle collet and the extensible member;

an outer collet positioned between the middle collet and the housing;

an inner bearing member positioned between the middle collet and the inner collet;

a outer bearing member positioned between the middle collet and the outer collet; and a biasing element for releasably biasing the middle collet against the inner and outer bearing members, thereby causing the outer collet to frictionally engage the clamp housing and the inner collet to frictionally engage the extensible member to releasably fix the extension of the extensible member with respect to the clamp housing, the biasing element providing a sustained biasing force and the inner bearing member and outer bearing member preventing binding of the middle collet as temperature changes of the adjustable work piece support causes dimensional changes of the clamp, the clamp thereby securely fixing the extension of the extensible member, yet allowing the extension to change when the bias against the middle collet is removed.

2. The apparatus of claim 1 in which the inner and outer bearing members each comprise a set of ball bearings.

3. The apparatus of claim 1 in which the middle collet is tapered in a first direction and wherein at least one of the inner collet and outer collet is tapered in a second direction opposite to that of the first direction taper of the middle collet.

4. The apparatus of claim 1 in which the biasing element applies a bias mechanically.

5. The apparatus of claim 4 in which the biasing element comprises one or more springs that provide a constant biasing force.

6. The apparatus of claim 1 in which the middle collet is displaceable between an engaged and a disengaged position, the middle collet being biased in the engaged position by the biasing element against the inner and outer bearing elements sufficiently to fix the extension of the extensible member and the middle collet not being biased in such manner in the disengaged position.

7. The apparatus of claim 6 in which the biasing element comprises one or more springs and in further comprising pneumatic means for moving the middle collet to the disengaged position.

8. The apparatus of claim 1 further comprising means for applying force to overcome the biasing element to release the clamp.

9. The apparatus of claim 8 in which the means for applying force to overcoming the biasing element is pneumatically operated.

10. The apparatus of claim 8 in which the means for applying force to overcome the biasing element is electrically operated.

11. The apparatus of claim 1 in which the middle collet, inner collet, outer collet, inner bearing member, outer bearing member, and biasing element comprise a first clamp assembly and further including a second clamp assembly comprising:

a second clamp assembly middle collet surrounding the extensible member and positioned within the housing;
  a second clamp assembly inner collet positioned between the second clamp assembly middle collet and the extensible member;
  a second clamp assembly outer collet positioned between the second clamp assembly middle collet and the housing;
  a second clamp assembly inner bearing member positioned between the second clamp assembly middle collet and the second clamp assembly inner collet;
  a second clamp assembly outer bearing member positioned between the second clamp assembly middle collet and the second clamp assembly outer collet; and
  a second clamp assembly biasing element for releasably biasing the second clamp assembly middle collet against the second clamp assembly inner bearing member and second clamp assembly outer bearing member, the second clamp assembly biasing element biasing the corresponding second clamp assembly middle collet in a direction opposite to that in which the middle collet of the first clamp assembly is biased.

12. The apparatus of claim 11 further comprising a clamp release mechanism positioned between the first and second clamp assemblies for overcoming the biasing elements of the first and second clamp assemblies to unclamp the extensible member.

13. The apparatus of 12 in which the clamp release mechanism comprises an air chamber bounded by actuators that overcome the biasing elements when the air chamber is pressurized.

* * * * *